United States Patent
Chen et al.

(10) Patent No.: US 11,725,492 B2
(45) Date of Patent: Aug. 15, 2023

(54) METHOD TO GENERATE MICROFRACTURES BY CHEMICAL REACTION IN LOW CARBONATE MINERAL CONTENT SHALE RESERVOIRS

(71) Applicant: TEXAS TECH UNIVERSITY SYSTEM, Lubbock, TX (US)

(72) Inventors: Qiang Chen, Sichuan (CN); James J. Sheng, Lubbock, TX (US)

(73) Assignee: Texas Tech University System, Lubbock, TX (US)

( * ) Notice: Subject to any disclaimer, the term of this patent is extended or adjusted under 35 U.S.C. 154(b) by 0 days.

(21) Appl. No.: 16/435,178

(22) Filed: Jun. 7, 2019

(65) Prior Publication Data

US 2019/0376376 A1    Dec. 12, 2019

Related U.S. Application Data

(60) Provisional application No. 62/681,826, filed on Jun. 7, 2018.

(51) Int. Cl.
| | |
|---|---|
| *E21B 43/27* | (2006.01) |
| *E21B 43/28* | (2006.01) |
| *E21B 43/26* | (2006.01) |
| *C09K 8/62* | (2006.01) |
| *C09K 8/66* | (2006.01) |

(52) U.S. Cl.
CPC .............. *E21B 43/27* (2020.05); *C09K 8/665* (2013.01)

(58) Field of Classification Search
None
See application file for complete search history.

(56) References Cited

U.S. PATENT DOCUMENTS

| | | |
|---|---|---|
| 7,857,055 B2 | 12/2010 | Li |
| 10,753,190 B1 * | 8/2020 | Schipper ............... E21B 43/267 |
| 2014/0000897 A1 * | 1/2014 | Wang ..................... C09K 8/706 |
| | | 166/300 |
| 2015/0114638 A1 | 4/2015 | Taylor |
| 2017/0369329 A1 | 12/2017 | Paynter et al. |
| 2019/0376376 A1 | 12/2019 | Chen et al. |

(Continued)

FOREIGN PATENT DOCUMENTS

| | | | |
|---|---|---|---|
| CN | 103468237 A | 12/2013 | |
| WO | WO-2017161157 A1 * | 9/2017 | ............... C09K 8/74 |

OTHER PUBLICATIONS

[0149] Steiger, M., Crystal growth in porous materials—I: The crystallization pressure of large crystals, Journal of Crystal Growth 2005a, 282, 455-469 ("Steiger 2005a").

(Continued)

*Primary Examiner* — Charles R Nold
(74) *Attorney, Agent, or Firm* — Dickinson Wright PLLC; Ross Spencer Garsson

(57) ABSTRACT

A method for generating microfractures in low carbonate mineral content shale reservoirs in which sulfate acid or persulfate compound (such as ammonium persulfate (($NH_4)_2S_2O_8$)) injected into conventional fracturing fluid can react with shale carbonate components resulting in the precipitation reaction of gypsum crystal ($CaSO_4 \cdot 2H_2O$) to occur.

20 Claims, 17 Drawing Sheets

(56) References Cited

U.S. PATENT DOCUMENTS

2020/0340342 A1\* 10/2020 Schipper ............... C09K 8/665

OTHER PUBLICATIONS

[0150] Ulven, O. I. et al., Fracture initiation during volume increasing reactions in rocks and applications for CO2 sequestration. Earth and Planetary Science Letters 2014, 389, 132-142 ("Ulven 2014").
[0151] Vasconcelos, C. et al., Microbial mediation as a possible mechanism for natural dolomite formation at low temperatures, Nature 1999, 377, 220-222 ("Vasconcelos 1999").
[0152] Vidic, R.D. et al., Impact of shale gas development on regional water quality, Science 2012, 340, 1235009 ("Vidic 2012").
[0153] Watt, G. R. et al., Evidence for reaction-induced microfracturing in granulite facies migmatites, Geology 2000, 28(4), 327-330 ("Watt 2000").
[0154] Zhao, D. et al., Effect and mechanism of persulfate activated by different methods for PAHs removal in soil, J Hazard Mater 2013, 254-255, 228-235 ("Zhao 2013").
[0155] Zhu, W. et al., Experimental evidence of reaction-induced fracturing during olivine carbonation, Geophysical Research Letters 2016, 43, 9535-9543 ("Zhu 2016").
[0100] Al-Khaldi, M. H. et al., New insights into the removal of calcium sulfate scale, SPE European Formation Damage Conference, Society of Petroleum Engineers 2011 ("Al-Khaldi 2011").
[0110] Hakala, J. A. et al., Laboratory-Scale Studies on Chemical Reactions Between Fracturing Fluid and Shale Core From the Marcellus Shale Energy and Environmental Laboratory (MSEEL) Site, Unconventional Resources Technology Conference, Austin, Texas, Jul. 24-26, 2017, 1458-1467 ("Hakala 2107").
[0099] Abdel-Aal, E. A. et al., Crystallization of calcium sulfate dihydrate at different supersaturation ratios and different free sulfate concentrations, Crystal Research and Technology 2004, 39, 313-321 ("Abdel-Aal 2004").
[0101] Bao, Z. et al., Modeling controls on the chemical weathering of marine mudrocks from the Middle Jurassic in Southern Germany, Chemical Geology 2017, 459, 1-12 ("Bao 2017").
[0102] Bergsaker, A. S. et al., The effect of fluid composition, salinity, and acidity on subcritical crack growth in calcite crystals. Journal of Geophysical Research: Solid Earth 2016, 121, 1631-1651 ("Bergsaker 2016").
[0103] Bibby, K. J. et al., Suggested reporting parameters for investigations of wastewater from unconventional shale gas extraction, Environ Sci. Technol., 2013, 47(23), 13220-13221 ("Bibby 2013").
[0104] Bultreys, T. et al., Imaging and image-based fluid transport modeling at the pore scale in geological materials: A practical introduction to the current state-of-the-art, Earth-Science Reviews 2016, 155, 93-128 ("Bultreys 2016").
[0105] Chen, Q. et al., Change in composition and pore structure of Longmaxi black shale during oxidative dissolution, International Journal of Coal Geology 2017, 172, 95-111 ("Chen 2017").
[0106] Drake, H. et al., Extreme (13)C depletion of carbonates formed during oxidation of biogenic methane in fractured granite, Nat Commun 2015, 6, 7020 ("Drake 2015").
[0107] Evangelou, V. et al., A review: pyrite oxidation mechanisms and acid mine drainage prevention, Critical Reviews in Environmental Science and Technology 1995, 25, 141-19 ("Evangelou 1995").
[0108] Ghanbari, E. et al., Impact of rock fabric on water imbibition and salt diffusion in gas shales, International Journal of Coal Geology 2015, 138, 55-67 ("Ghanbari 2015").
[0109] Gutierrez, M. et al., Determination of the continuous stress-dependent permeability, compressibility and poroelasticity of shale, Marine and Petroleum, Geology 2015, 68, 614-628 ("Gutierrez 2015").
[0111] Heidari, P. et al., A reactive transport model for Marcellus shale weathering, Geochimica et Cosmochimica Acta 2017, 217, 421-440 ("Heidari 2017").
[0112] Jia, H. et al., Discussion of the feasibility of air injection for enhanced oil recovery in shale oil reservoirs, Petroleum 2017, 3 ("Jia 2017").
[0113] Jin, L. et al., Evolution of porosity and geochemistry in Marcellus Formation black shale during weathering, Chemical Geology 2013, 356, 50-63 ("Jin 2013").
[0114] Kan, A. T. et al., Quantitative evaluation of calcium sulfate precipitation kinetics in the presence and absence of scale inhibitors, SPE International Symposium on Oilfield Chemistry, Society of Petroleum Engineers 2009 ("Kan 2009").
[0115] Kelemen, P. B. et al., Reaction-driven cracking during retrograde metamorphism: Olivine hydration and carbonation, Earth and Planetary Science Letters 2012, 345, 81-89 ("Kelemen 2012").
[0116] Keller, W. et al., Comparative chemical compositions of aqueous extracts from representative clays, American Mineralogist 1989, 74, 1142-1146 ("Keller 1989").
[0117] King, G. E., Hydraulic fracturing 101: what every representative, environmentalist, regulator, reporter, investor, university researcher, neighbor, and engineer should know about hydraulic fracturing risk, Journal of Petroleum Technology 2012, 64, 34-42 ("King 2012").
[0118] Liang, C. et al., Oxidative degradation of MTBE by pyrite-activated persulfate: proposed reaction pathways, Industrial & Engineering Chemistry Research 2010, 49, 8858-8864 ("Liang 2010").
[0119] Liu, H. et al., In situ chemical oxidation of contaminated groundwater by persulfate: decomposition by Fe(III)- and Mn(IV)-containing oxides and aquifer materials, Environ Sci Technol, 2014, 48, 10330-10336 ("Liu 2014").
[0120] Malvoisin, B. et al., Control of serpentinisation rate by reaction-induced cracking, Earth and Planetary Science Letters 2017, 476, 143-152 ("Malvoisin 2017").
[0121] Manz, K.E. et al., Investigating the effects of heat activated persulfate on the degradation of furfural, a component of hydraulic fracturing fluid chemical additives, Chemical Engineering Journal 2017, 327, 1021-1032 ("Manz 2017").
[0122] Marcon, V. et al., Experimental insights into geochemical changes in hydraulically fractured Marcellus Shale, Applied Geochemistry 2017, 76, 36-50 ("Marcon 2017").
[0123] Meijer, J. et al., Solubilities and supersaturations of calcium sulfate and its hydrates in seawater, Desalination 1984, 51, 255-305 ("Meijer 1984").
[0125] Noiriel, C. et al., Intense fracturing and fracture sealing induced by mineral growth in porous rocks, Chemical Geology 2010, 269, 197-209 ("Noiriel 2010").
[0126] Pearce, J. et al., Experimental and predicted geochemical shale-water reactions: Roseneath and Murteree shales of the Cooper Basin, International Journal of Coal Geology 2018, 187 ("Pearce 2017").
[0127] Ping, X. et al., Mechanism of sulphate expansion II. Validation of Thermodynamic Theory, Cement and Concrete Research 1992, 22, 845-854 ("Ping 1992").
[0128] Plümper, O. et alo, The interface-scale mechanism of reaction-induced fracturing during serpentinization, Geology 2012, 40, 1103-1106 ("Plümper 2012").
[0129] Putnis, A., Mineral replacement reactions, Reviews in mineralogy and geochemistry 2009, 70, 87-124 ("Putnis 2009").
[0130] Putnis, A., Mineral replacement reactions: from macroscopic observations to microscopic mechanisms, Mineralogical Magazine 2002, 66, 689-708 ("Putnis 2002").
[0131] Putnis, C. V. et al., The Mineral-Water Interface: Where Minerals React with the Environment, Elements 2013, 9, 177-182 ("Putnis 2013").
[0132] Putnis, C. V., Direct observations of pseudomorphism: compositional and textural evolution at a fluid-solid interface, American Mineralogist 2005, 90, 1909-1912 ("Putnis 2005").
[0133] Ren, L. et al, Stimulated reservoir volume estimation for shale gas fracturing: Mechanism and modeling approach, Journal of Petroleum Science and Engineering 2018, 166, 290-304 ("Ren 2018").
[0134] Roshan, H. et al., Mechanisms of water adsorption into partially saturated fractured shales: An experimental study, Fuel 2015, 159, 628-637 ("Roshan 2015").

(56) References Cited

OTHER PUBLICATIONS

[0135] Rostom, F. et al. Effect of fluid salinity on subcritical crack propagation in calcite, Tectonophysics 2013, 583, 68-75 ("Rostom 2013").

[0136] Roychaudhuri, B. et al., An experimental investigation of spontaneous imbibition in gas shales, Journal of Petroleum Science and Engineering 2013, 111, 87-97 ("Roychaudhuri 2013").

[0137] Røyne, A. et al., Pore-Scale Controls on Reaction-Driven Fracturing, Reviews in Mineralogy and Geochemistry 2015, 80, 25-44 ("Røyne 2015").

[0138] Røyne, A. et al., Controls on rock weathering rates by reaction-induced hierarchical fracturing, Earth and Planetary Science Letters 2008, 275, 364-369 ("Røyne 2008").

[0139] Rudge, J. F. et al., A simple model of reaction-induced cracking applied to serpentinization and carbonation of peridotite, Earth and Planetary Science Letters, 2010, 291, 215-227 ("Rudge 2010").

[0140] Ruiz-Agudo, E. et al., Experimental study of the replacement of calcite by calcium sulphates, Geochimica et Cosmochimica Acta 2015, 156, 75-93 ("Ruiz-Agudo 2015") ("Ruiz-Agudo 2015").

[0141] Ruiz-Agudo, E. et al., Coupled dissolution and precipitation at mineral-fluid interfaces, Chemical Geology 2014, 383, 132-146 ("Ruiz-Agudo 2014").

[0142] Ruiz-Agudo, E. et al., The role of saline solution properties on porous limestone salt weathering by magnesium and sodium sulfates, Environmental Geology, 2007, 52, 269-281 ("Ruiz-Agudo 2007").

[0143] Serafeimidis, K. et al., On the crystallisation pressure of gypsum, Environmental earth sciences 2014b, 72, 4985-4994 ("Serafeimidis 2014b").

[0144] Serafeimidis, K. et al., The Solubilities and Thermodynamic Equilibrium of Anhydrite and Gypsum, Rock Mechanics and Rock Engineering 2014a, 48, 15-31 ("Serafeimidis 2014a").

[0145] Li, H. et al., Experimental Investigation on Brazilian Tensile Strength of Organic-Rich Gas Shale, Society of Petroleum Engineers 2016 ("Li 2016").

[0146] Simate, G. S. et al., Acid mine drainage: Challenges and opportunities, Journal of Environmental Chemical Engineering 2014, 2, 1785-1803 ("Simate 2014").

[0147] Steiger, M. et al., Crystallization of sodium sulfate phases in porous materials: The phase diagram $Na_2SO_4$—$H_2O$ and the generation of stress, Geochimica et Cosmochimica Acta 2008, 72, 4291-4306 ("Steiger 2008").

[0148] Steiger, M., Crystal growth in porous materials—II: Influence of crystal size on the crystallization pressure, Journal of Crystal Growth 2005b, 282, 470-481 ("Steiger 2005b").

Mokhtari, M. et al., Tensile Failure of Shales: Impacts of Layering and Natural Fractures, Oncology, Society of Petroleum Engineers 2014 ("Mokhtari 2014").

Offeddu, F. et al., Direct nanoscale observations of the coupled dissolution of calcite and domomite and the precipitation of gypsum, Beilstein J Nanotechnol 2014, 5, 1245-1253 ("Offeddu 2014").

Vankeuren et al., "Minerals Reactions in Shale Gas Reservoirs: Barite Scale Formation from Reusing Produced Water as Hydraulic Fracturing Fluid"; Environmental Science & Technology 2017, vol. 51, 12 pages.

International Searching Authority, International Search Report and Written Opinion for PCT/US19/36134 dated Oct. 28, 2019, 10 pages.

\* cited by examiner

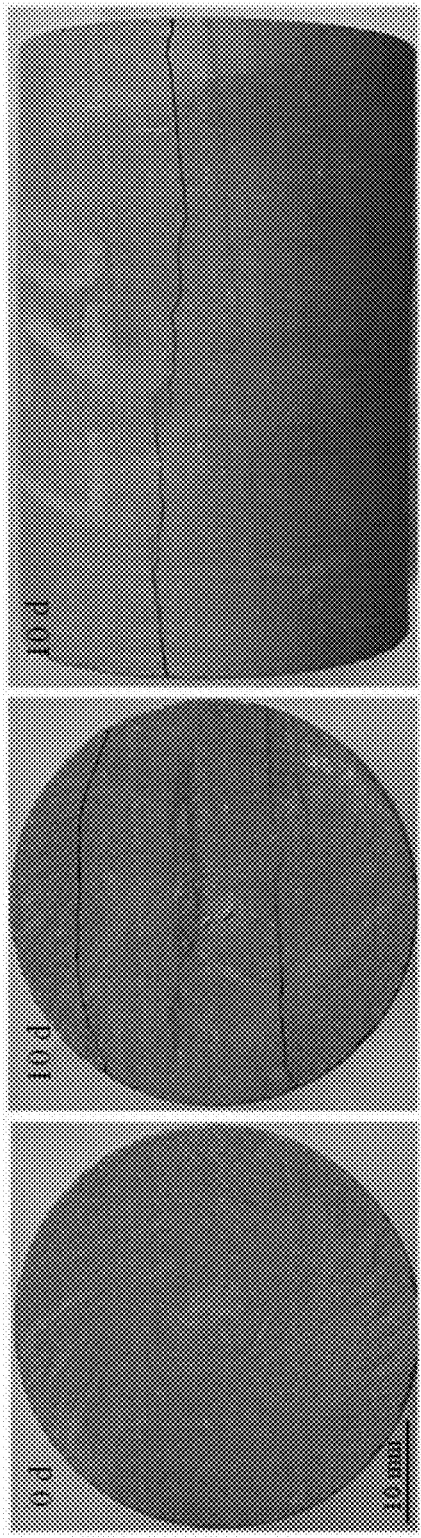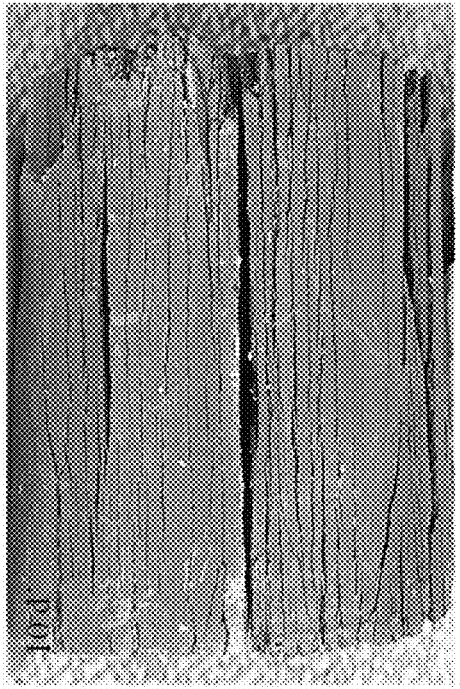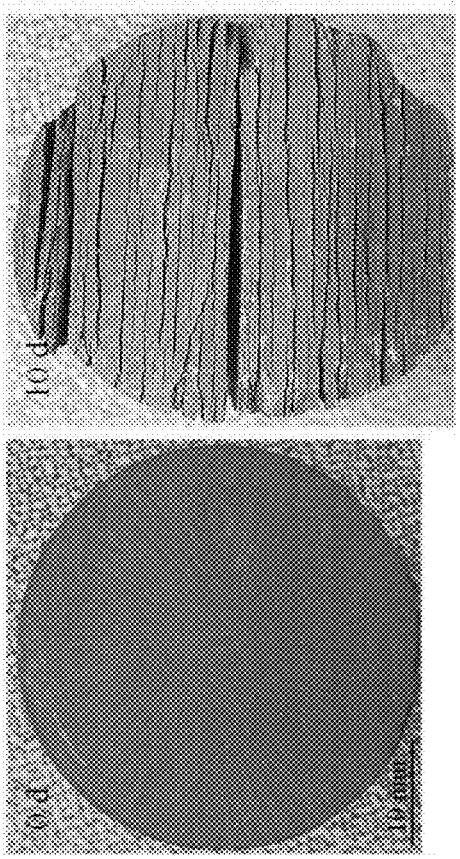

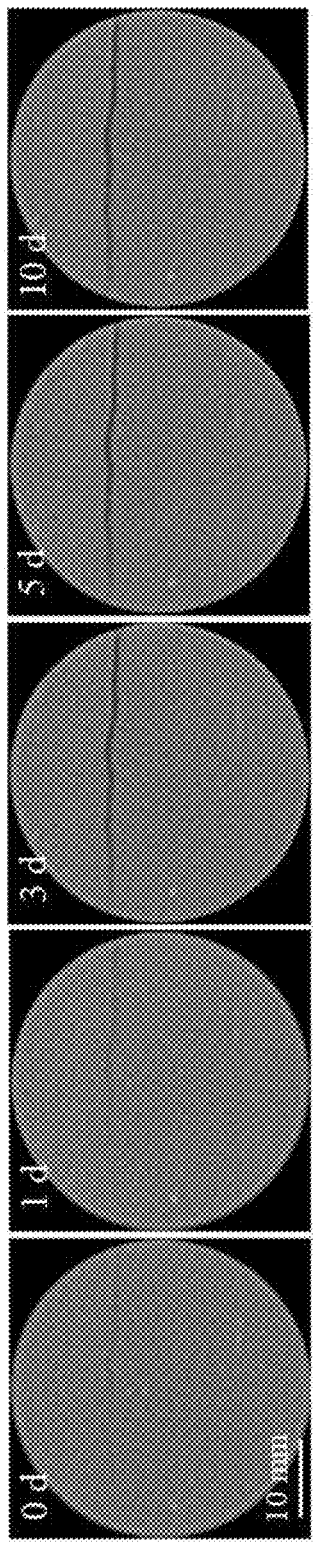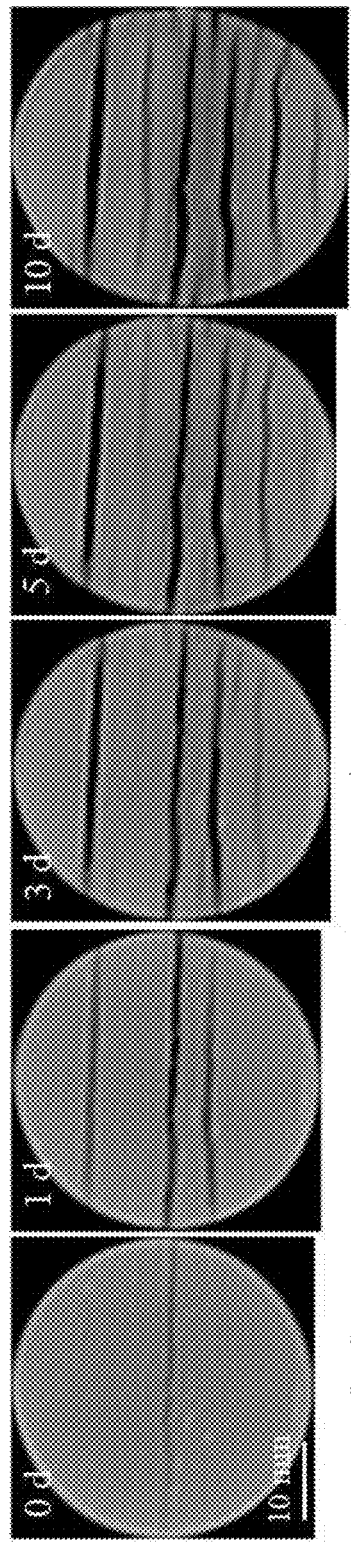

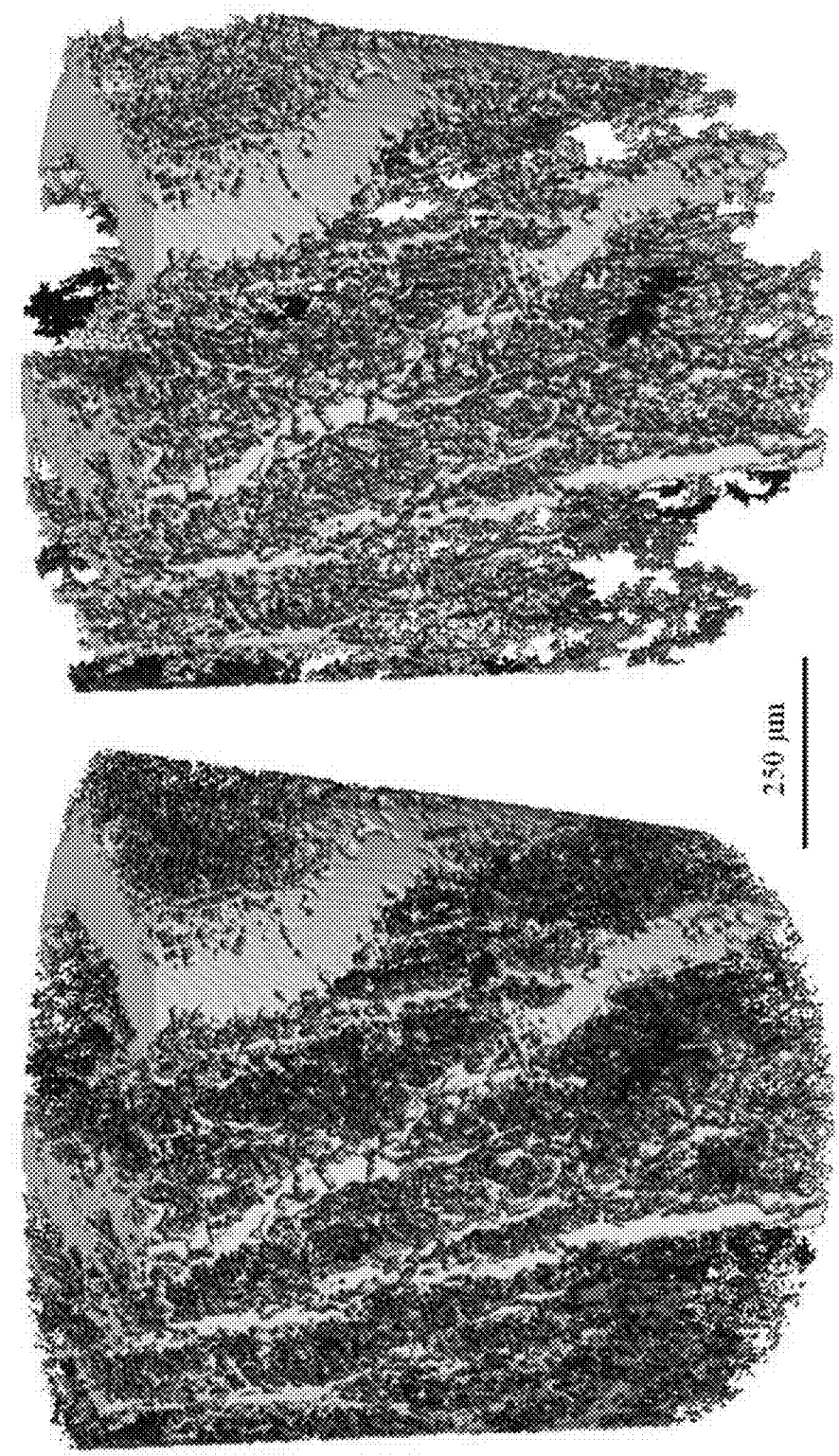

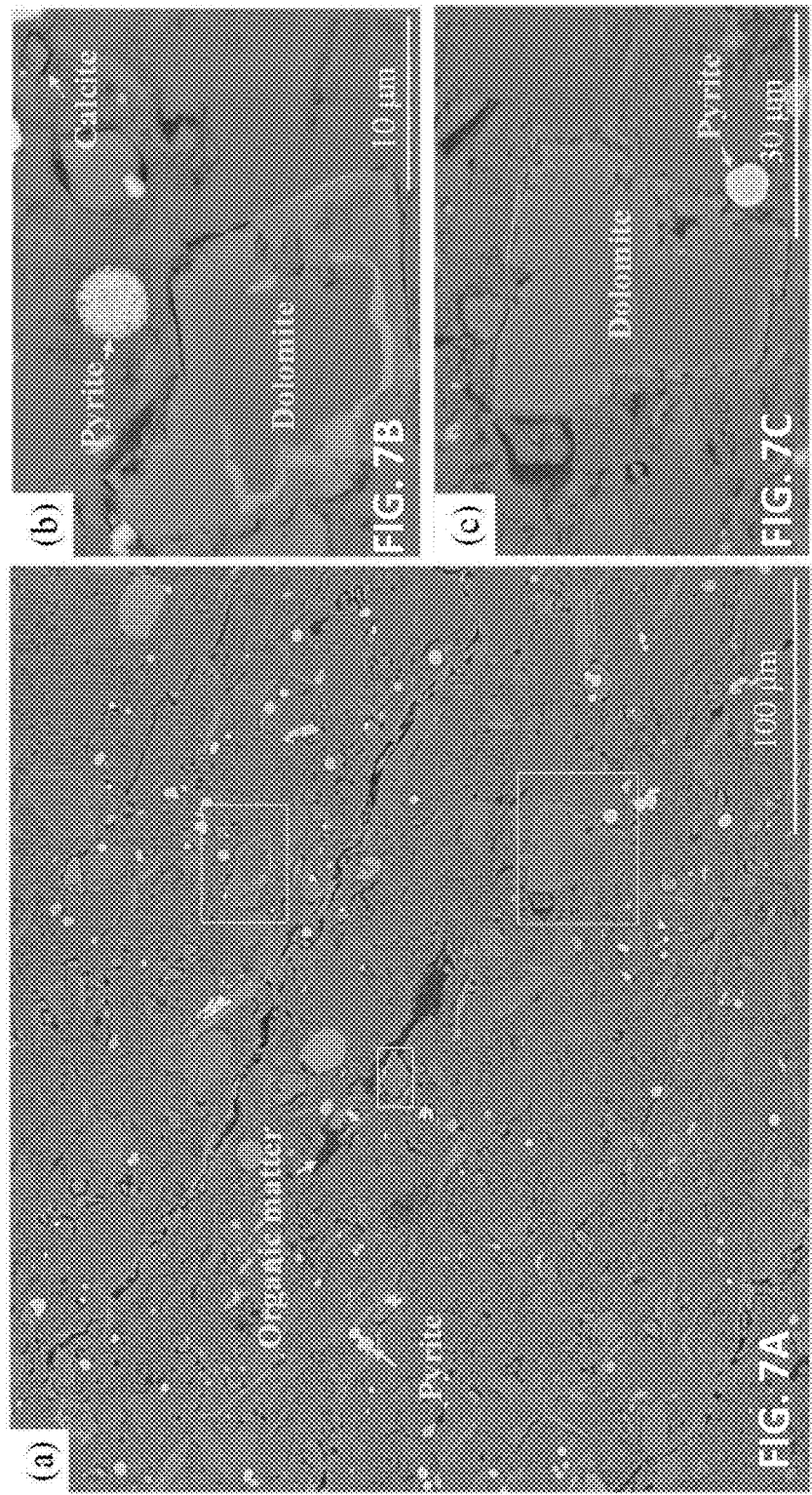

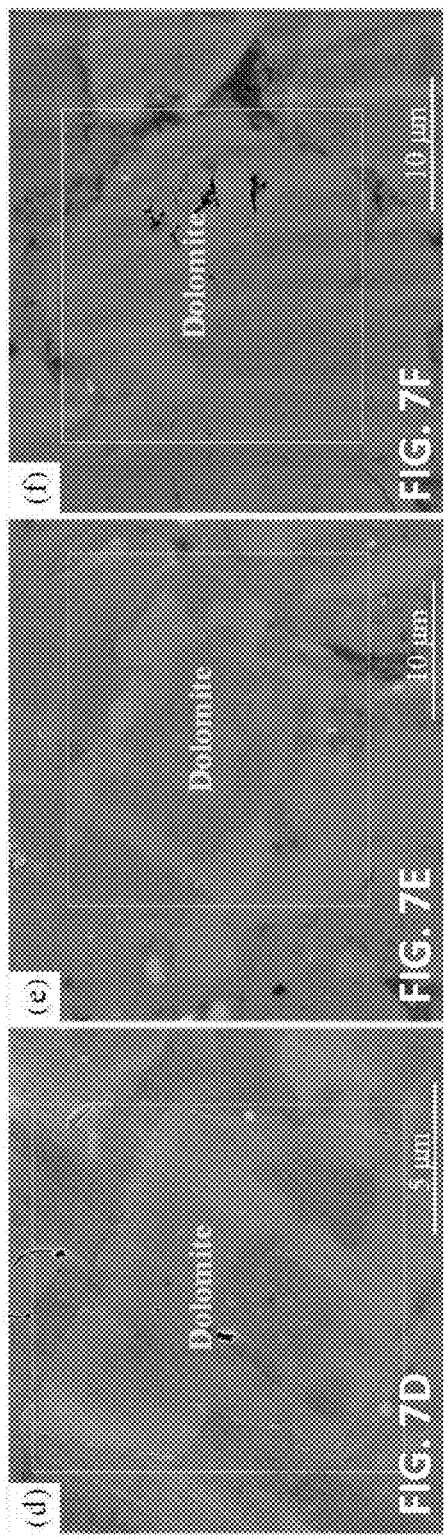

METHOD TO GENERATE MICROFRACTURES BY CHEMICAL REACTION IN LOW CARBONATE MINERAL CONTENT SHALE RESERVOIRS

CROSS-REFERENCE TO RELATED PATENT APPLICATION

This application claims priority to U.S. Patent Appl. Ser. No. 62/681,826, entitled "Method To Generate Microfractures By Chemical Reaction In Low Carbonate Mineral Content Shale Reservoirs," filed Jun. 7, 2018, which patent application is commonly owned by the owner of the present invention. This patent application is incorporated herein in their entirety.

TECHNICAL FIELD

The present invention relates to advanced methods for extracting hydrocarbons from the ground, and more particularly, by generating microfractures in carbonate mineral-bearing (up to 30 wt. %) shale reservoirs.

BACKGROUND

With many of the more straightforward wells already drilled, advanced methods are needed to extract hydrocarbons from the ground. As energy demand increases, new extraction methods will be needed to keep up. While there are already several well stimulation techniques, there is always room for innovation.

A popular solution to this problem is hydraulic fracturing. Hydraulic fracturing is a technique which increases the fracture-to-matrix contact area, and is the most commonly used method for shale oil/gas recovery. [Ren 2018]. In general terms, this process involves pumping water, sand, and chemicals down into the reservoir at very high pressures to crack the reservoir rock. These cracks provide a channel for oil and gas to flow through, thus increasing the amount that can be extracted.

For a tight shale formation, the formation of much-more-denser secondary-fracture networks is the most direct factor affecting the oil/gas extraction. The conventional methods for the formation of sufficient secondary fractures are improving the injection volume of fracturing water into shale reservoir. It was considered that the more injection volume, the larger quantities of secondary fracture. [King 2012]. If fresh water is available with an extremely-low price, more volume of fracturing water would be injected to increase the number or volume of induced fractures. In the area of water scarcity such as desert, it is, however, expensive to satisfy the demand for fracturing water. Additional information regarding hydraulic fracturing is described in Ground Water Protection Council and ALL Consulting, "Modern Shale Gas Development in the United States: A Primer," prepared for U.S. Department of Energy Office of Fossil Energy and National Energy Technology Laboratory, April 2009 (pp. 56-66, section on "Hydraulic Fracturing") (the "GWPC Primer"), which is hereby incorporated by reference in its entirety of all purposes.

Per the GWPC Primer, at p. 56:
Hydraulic fracturing involves the pumping of a fracturing fluid into a formation at a calculated, predetermined rate and pressure to generate fractures or cracks in the target formation. For shale gas development, fracture fluids are primarily water-based fluids mixed with additives which help the water to carry sand proppant into the fractures. The sand proppant is needed to "prop" open the fractures once the pumping of fluids has stopped. Once the fracture has initiated, additional fluids are pumped into the wellbore to continue the development of the fracture and to carry the proppant deeper into the formation. The additional fluids are needed to maintain the downhole pressure necessary to accommodate the increasing length of opened fracture in the formation.

When discussing the fracturing fluids and additives used in hydraulic fracturing, the GWPC Primer further set forth at p. 61 (with footnotes omitted):
As described above, the current practice for hydraulic fracture treatments of shale gas reservoirs is to apply a sequenced pumping event in which millions of gallons of water-based fracturing fluids mixed with proppant materials are pumped in a controlled and monitored manner into the target shale formation above fracture pressure.

The fracturing fluids used for gas shale stimulations consist primarily of water but also include a variety of additives. The number of chemical additives used in a typical fracture treatment varies depending on the conditions of the specific well being fractured. A typical fracture treatment will use very low concentrations of between 3 and 12 additive chemicals depending on the characteristics of the water and the shale formation being fractured. Each component serves a specific, engineered purpose. The predominant fluids currently being used for fracture treatments in the gas shale plays are water-based fracturing fluids mixed with friction-reducing additives (called slickwater).

The addition of friction reducers allows fracturing fluids and proppant to be pumped to the target zone at a higher rate and reduced pressure than if water alone were used. In addition to friction reducers, other additives include: biocides to prevent microorganism growth and to reduce bio-fouling of the fractures; oxygen scavengers and other stabilizers to prevent corrosion of metal pipes; and acids that are used to remove drilling mud damage within the near-wellbore area. These fluids are used not only to create the fractures in the formation but also to carry a propping agent (typically silica sand) which is deposited in the induced fractures.

Furthermore, the deep and high-volume injection (greater than 10,000 $m^3$/well) during shale fracturing are responsible for the increasing regional environmental risks. [Vidic 2012; Bibby 2013]. Based on the extensive observations of spontaneous fracture propagation caused by volume expanding reaction in surface and deep buried rocks [Royne 2008; Plumper 2012], reaction-driven cracking in organic-rich shales may provide a potential strategy to create the required fracture networks for oil/gas extraction without high-volume water injection.

Rock-fluid interactions concurrent with volume expansion is capable of fracturing the rocks due to the increasing stress. The positive volume changes are controlled by the density differences between the dissolving minerals and newly-formed mineral precipitations or solid products. This so-called reaction-driven cracking is commonly observed in chemical weathering of earth's surface rocks [Ulven 2014; Rudge 2010; Ruiz-Agudo 2007] and during serpentinization and carbonation of mantle peridotite in earth upper crust of up to 10 km depth. [Plumper 2012; Kelemen 2012: Zhu 2016]. Previous numerical models [Royne 2008; Rudge 2010; Ruiz-Agudo 2007] and experimental studies [Plumper 2012; Watt 2000] of the excess stress generated by local reactions have showed that they might easily exceed the rock tensile strength typically ranging from less than 10 MPa to 100 MPa, then eventually fracturing rocks. Except for local reaction-driven expansion, the preferential dissolution at the crack tips also facilitate the fracture initiation and propagation in reacting rocks due to the chemically activated processes of subcritical cracking. [Bergsaker 2016; Rostom 2013].

The water-rock interactions are widely observed from shale oxidative weathering in the surface [Jin 2013; Heidari 2017; Bao 2017] and during hydraulic fracturing within hydrocarbon-bearing shale formations [Marcon 2017; Hakala 2107; Pearce 2017] due to the presence of a large amount (greater than 20 vol. %) of highly reactive compositions. Based on the chemical equations to describe these water-rock interactions, the relatively highly reactive phases in organic-rich shales include reducing phases (pyrite and kerogen), carbonates (calcite, dolomite, ankerite, and siderite), and clay minerals (chlorite, illite).

For shale hydraulic fracturing, oxidation of reducing phase (e.g., pyrite and kerogen), acid dissolution of calcite and dolomite, and precipitation of barite scale and calcium sulfate are the most observed geochemical reactions caused by various chemical additives in fracturing water. Dilute acid (e.g., hydrochloric acid) and strong oxidizers (e.g., ammonium persulfate) are one of the commonly used additives in hydraulic fracturing. As their extremely-low concentrations (less than 1 wt. %) in fracturing fluid [Marcon 2017; Manz 2017], the possibility of fracturing organic-rich shale by chemical reactions seems to have been ignored.

SUMMARY OF THE INVENTION

The present invention relates to a supplement to hydraulic fracturing to be used in shale reservoirs with carbonate mineral present (up to 30 wt. %). The method includes the addition of sulfate acid or persulfate compound to normal fracture fluid. The added compound reacts with the reservoir rock to form gypsum crystals. The stress exerted by these crystals forming can further crack the reservoir rock, leading to more secondary fractures. Typically, when the pressurized fluid is removed, some of the cracks close up due to the weight of all the ground above them. However, the added gypsum crystals help to support some of this weight and can keep the fractures open. All of these effects lead to higher recovery from the well. Additionally, less water is needed using this method, when compared to normal hydraulic fracturing to achieve the same result. This leads to greater recovery at lower cost.

In the present invention, the shale-fluid interactions can create spontaneous fracture propagation in reacting shales. For instance, in an embodiment of the present invention, an aqueous solution containing a relatively high content (10 wt. %) of ammonium persulfate ($(NH_4)_2S_2O_8$) was used to react with shale samples, which reaction-induced fractures in the shale were observed using CT imaging. Analysis of the mineralogy revealed alteration and morphology of the newly-formed crystal precipitation. The reaction induced crystallization pressure provided the shale fracturing during the volume-expanding reactions.

The present invention improve the stimulated reservoir volume ("SRV") during hydraulic fracturing in shale oil or gas reservoir by the formation of much denser secondary microfracture networks, which produce more flow pathways for hydrocarbon to migrate from the formation into the wellbore, and therefore allows the hydrocarbon to be produced from the reservoir at an increased production rate compared the conventional hydraulic fracturing. Because of the much lower injection volume of fracturing water, the present invention is also applicable to reduce the environmental risks, especially related to regional water quality during hydraulic fracturing.

In general, in one embodiment, the invention features a method that includes selecting a fracturing fluid. The fracturing fluid was made by adding a content of sulfate acid or persulfate compound material to an aqueous solution. The sulfate acid or persulfate compound material is selected from a group consisting of (A) sulfate acids, (B) persulfate compounds, and (C) combinations thereof. The content of the sulfate acid or persulfate compound material that was added to the aqueous solution is at least 1 wt. % of the fracturing fluid. The method further includes selecting a well in a shale reservoir formation. The well has a wellbore that is in operative fluid communication with the shale reservoir formation. The method further includes pumping the fracturing fluid under pressure down the wellbore of the well to hydraulically fracture the shale reservoir formation. The method further includes discontinuing the pumping of the fracturing fluid. The method further includes producing hydrocarbons from the shale reservoir formation through the wellbore.

Implementations of the invention can include one or more of the following features:

The method can further include forming gypsum crystals in the shale reservoir formation by a reaction of the sulfate acid or persulfate compound material and carbonate materials in the shale reservoir formation. The formation of the gypsum crystals can result in a network of microfractures in the shale reservoir.

The content of the sulfate acid or persulfate compound material that was added to the aqueous solution can be at least 10 wt. % of the fracturing fluid.

The content of the sulfate acid or persulfate compound material that was added to the aqueous solution can be at most 30 wt. % of the fracturing fluid.

The sulfate acid or persulfate compound material can be selected from a group consisting of ammonium persulfate, sulfuric acid, sodium sulfate, potassium sulfate, peroxodisulfuric acid, sodium persulfate, potassium persulfate, and combinations thereof.

The sulfate acid or persulfate compound material can include ammonium persulfate.

The shale reservoir formation can include at most 30 wt. % of carbonate minerals.

The gypsum crystals can prevent the microfractures from closing under normal stress after the step of discontinuing the pumping of the fracturing fluid.

The formation of the gypsum crystals in the shale reservoir formation can provide a crystallization pressure that is at least 30 MPa.

The permeability of the shale reservoir formation near the formation can be increased by the hydraulic fracturing process. The production of hydrocarbons from the shale reservoir formation through the wellbore can be increased by the hydraulic fracturing process.

In general, in another embodiment, the invention features a method that includes adding a sulfate acid or persulfate compound material into an aqueous solution to form fracturing fluid. The sulfate acid or persulfate compound material is selected from a group consisting of (A) sulfate acids, (B) persulfate compounds, and (C) combinations thereof. The method further includes injecting the fracturing fluid into a shale reservoir formation having a content of carbonate mineral of at most 30 wt. %. The method further includes generating microfractures in the shale reservoir formation by a chemical reaction of carbonate components of the shale reservoir formation with the fracturing fluid. The chemical reaction includes a precipitation reaction to form gypsum crystals in the shale reservoir formation.

Implementations of the invention can include one or more of the following features:

The precipitation reaction to form gypsum crystals can occur because an insoluble calcium sulfate solid is formed during the reaction of the carbonate components of the shale reservoir formation with the fracturing fluid.

The content of the sulfate acid or persulfate compound material added in the aqueous solution can be at least 10 wt. % of the fracturing fluid.

The content of the sulfate acid or persulfate compound material added in the aqueous solution can be at most 30 wt. % of the fracturing fluid.

The sulfate acid or persulfate compound material can be selected from a group consisting of ammonium persulfate, sulfuric acid, sodium sulfate, potassium sulfate, peroxodisulfuric acid, sodium persulfate, potassium persulfate, and combinations thereof.

The sulfate acid or persulfate compound material can include ammonium persulfate.

The gypsum crystals can prevent the microfractures from closing under normal stress after discontinuing the injection of the fracturing fluid.

The formation of the gypsum crystals in the shale reservoir formation can provide a crystallization pressure that is at least 30 MPa.

The permeability of the shale reservoir formation near the formation can be increased by the injection of the fracturing fluid. The production of hydrocarbons from the shale reservoir formation through the wellbore can be increased by the injection of the fracturing fluid.

The fracturing fluid can be injected at a pressure that hydraulically fractures the shale reservoir formation.

The gypsum crystals can prevent the hydraulic fractures of the shale reservoir formation from closing under normal stress after discontinuing the injection of the fracturing fluid.

DESCRIPTION OF DRAWINGS

FIGS. 1A-1C are photographs of an unconfined cylindrical core sample (50 mm in height, 38 mm in diameter) before (FIG. 1A) and ten days after exposure to deionized water (FIGS. 1B-1C).

FIGS. 1D-1F are photographs of an unconfined cylindrical core sample (50 mm in height, 38 mm in diameter) before (FIG. 1D) and ten days after exposure to a 10 wt. % $(NH_4)_2S_2O_8$ solution (FIGS. 1E-1F). Macroscopic observations of fractures induced by clay hydration (FIGS. 1A-1C) and chemical reaction (FIGS. 1D-1F) at a solid-to-fluid ratio of 1 g: 2.5 ml. These samples were cut parallel to lamination. Although there is a high abundance of clay minerals, only two fractures parallel to lamination were visible on shale sample (denoted shale sample A1 below) after exposure to deionized water for 10 days. Conversely, shale sample (denoted shale sample B1 below) that reacted with $(NH_4)_2S_2O_8$ for 10 days showed a considerable volume expansion and intensive fracturing, and the spacing of fractures in most of the observed area is less than 1 mm.

FIGS. 2A-2E are time lapsed CT imaging of the unconfined cylindrical core sample (50 mm in height, 38 mm in diameter) before (FIG. 2A), and after exposure to deionized water (after one day: FIG. 2B; after three days: FIG. 2C; after five days: FIG. 2D; and after ten days: FIG. 2E). This shale sample is denoted as shale sample A2 below.

FIGS. 2F-2J are time lapsed CT imaging of the unconfined cylindrical core sample (50 mm in height, 38 mm in diameter) before (FIG. 2F), and after exposure to a 10 wt. % $(NH_4)_2S_2O_8$ solution (after one day: FIG. 2G; after three days: FIG. 2H; after five days: FIG. 2I; and after ten days: FIG. 2J). Time-lapse in-situ CT imaging of the unconfined cylindrical core samples before and after exposure to deionized water (FIGS. 2A-2E) and $(NH_4)_2S_2O_8$ solution (FIGS. 2F-2J) at a solid-to-fluid ratio of 1 g: 2.5 ml. These images provided clear evidences for volume expansion and shale cracking. Note that many fractures on shale sample (denoted shale sample B2 below) were not detected by the low-resolution CT due to their apertures were smaller than the CT detection limit (0.35 mm/pixel).

FIG. 4A is a 3D rendering of the microfractures (volume fraction: 13.9%) and pores (volume fraction: 1.1%) induced by shale-$(NH_4)_2S_2O_8$ reaction of a sample of approximately 2 mm diameter (taken from the internal part of the unconfined cylindrical core sample shown in FIGS. 1E-1F).

FIG. 4B is a 3D rendering showing the extraction of the reaction induced microfractures (fracture volume fraction 13.9%) by shale-$(NH_4)_2S_2O_8$ reaction of a sample of approximately 2 mm diameter (taken from the internal part of the unconfined cylindrical core sample shown in FIGS. 1E-1F). Abundant microfractures could be seen within the approximately 2 mm diameter sample, which was cut from the internal part of sample B1. Each color in FIGS. 4A-4B defined an independent microfracture, and the small number of colors demonstrated the presence of a well-connected fracture networks at micrometer scale. However, these microfractures displayed a very rough surface, indicating the presence of minerals built in these microfractures.

Gyp-Gypsum, Chl-Chlorite, I-Illite, I/S-Illite/smectite mixed layer, Qtz-Quartz, Kfs-K-feldspar, and Pl-Plagioclase).

FIGS. 7A-7F are SEM images of highly-reactive minerals (e.g., pyrite, calcite and dolomite) performed on the unreacted surface of shale sample (shown in FIG. 1D). Distance between pyrite and carbonate minerals was less than 100 µm. In the SEM images of FIGS. 7A-7F, the observed dolomite grain size ranged from 10 to 40 µm. In contrast, the calcite was less than 5 m in size. However, both calcite and dolomite were mainly observed in rhombohedral shapes.

FIGS. 8A-8F are SEM images and chemical analyses by EDS showing the presence of gypsum after shale-$(NH_4)_2S_2O_8$ reaction for the core sample shown in FIGS. 1E-1F. The SEM image of FIG. 8A (with the corresponding chemical EDS analysis of FIG. 8D) show the cluster of gypsum crystal with a grain size greater than 10 µm.

Figures 8A, 8D:
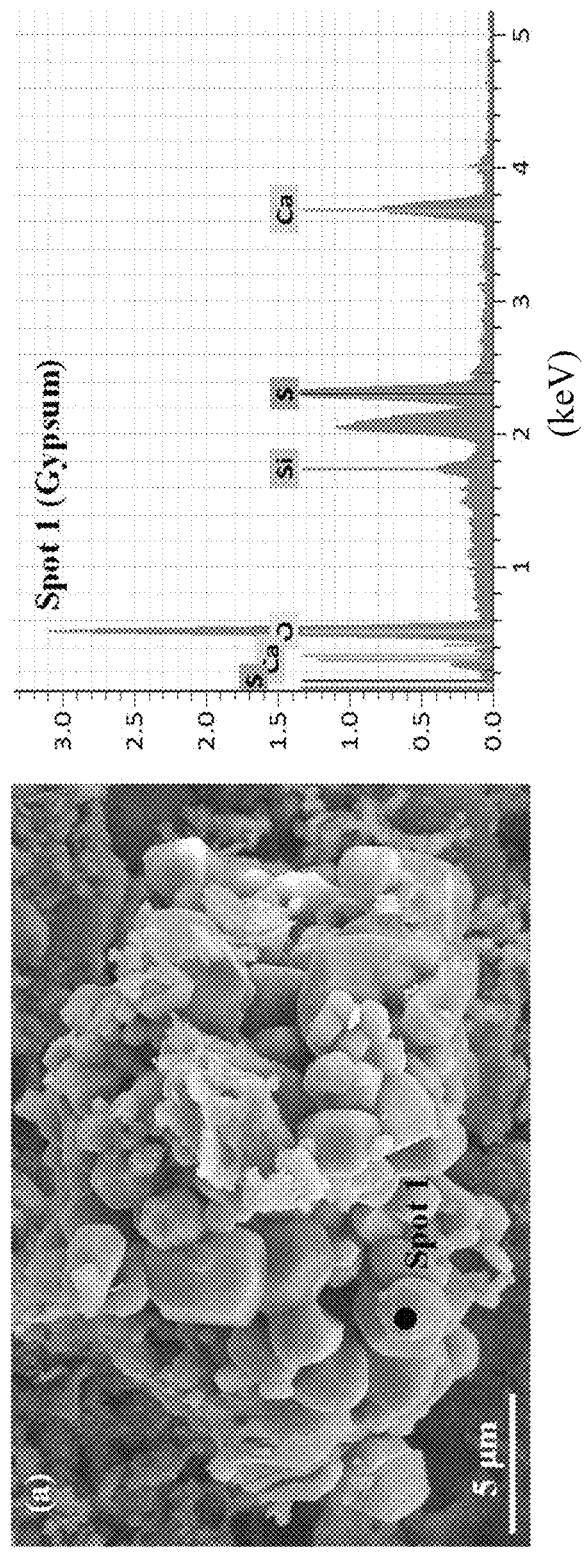
Figures 8B, 8E:
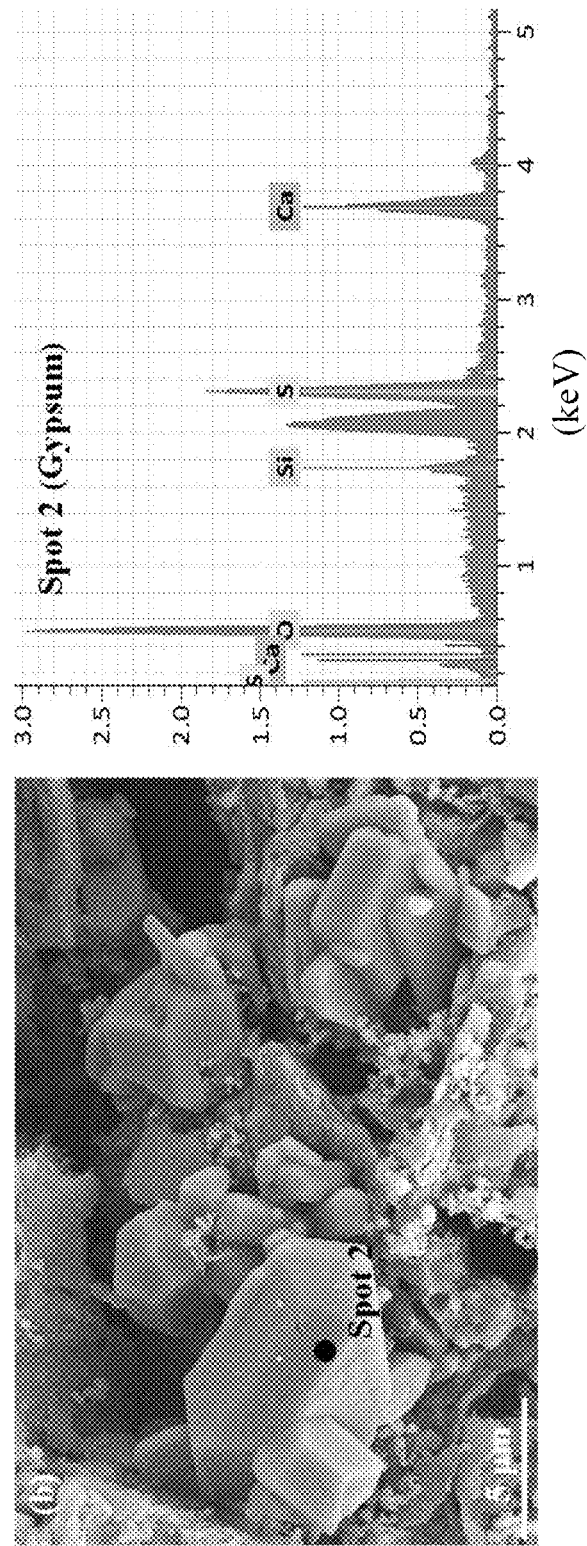
Figures 8C, 8F:
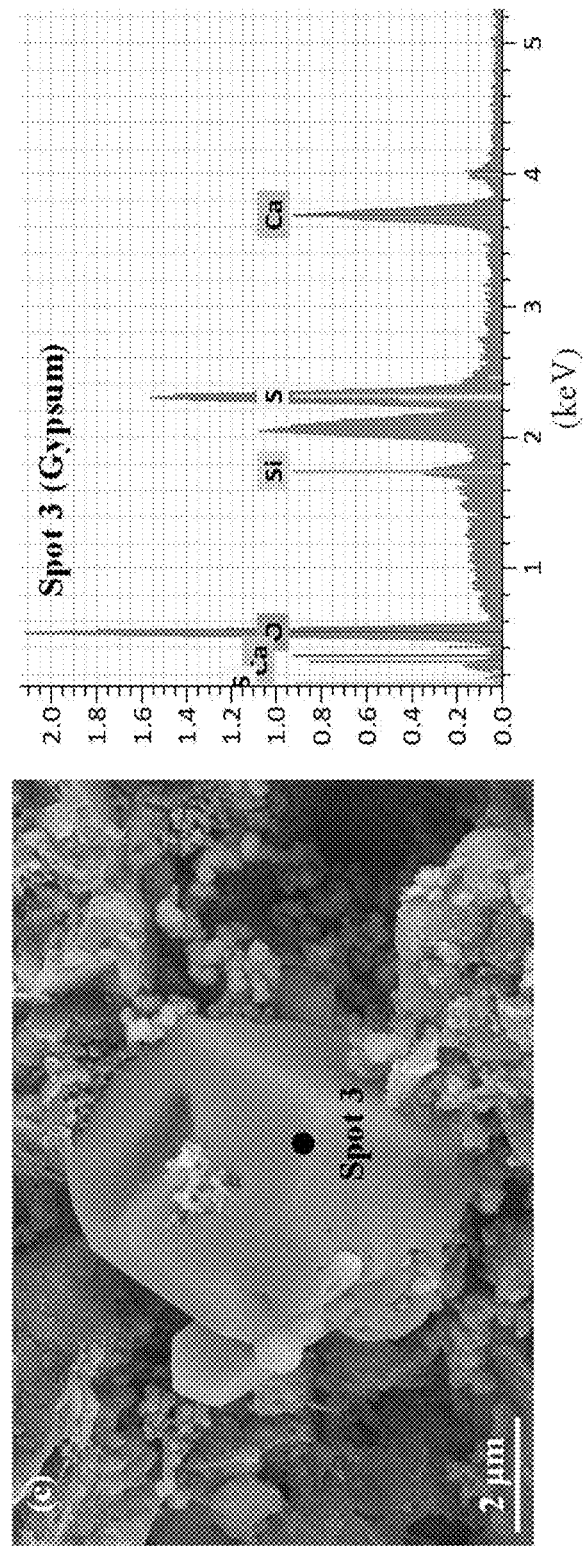

The SEM images of FIG. 8B-8C (with the corresponding chemical EDS analyses of FIGS. 8E-8F, respectively) show small grainy gypsum crystals ranging from several hundreds of nanometers to few micrometers in size. The SEM images and ESD analysis were performed on the reactive surface of the core sample shown in FIG. 1E-1F.

Figure 9:
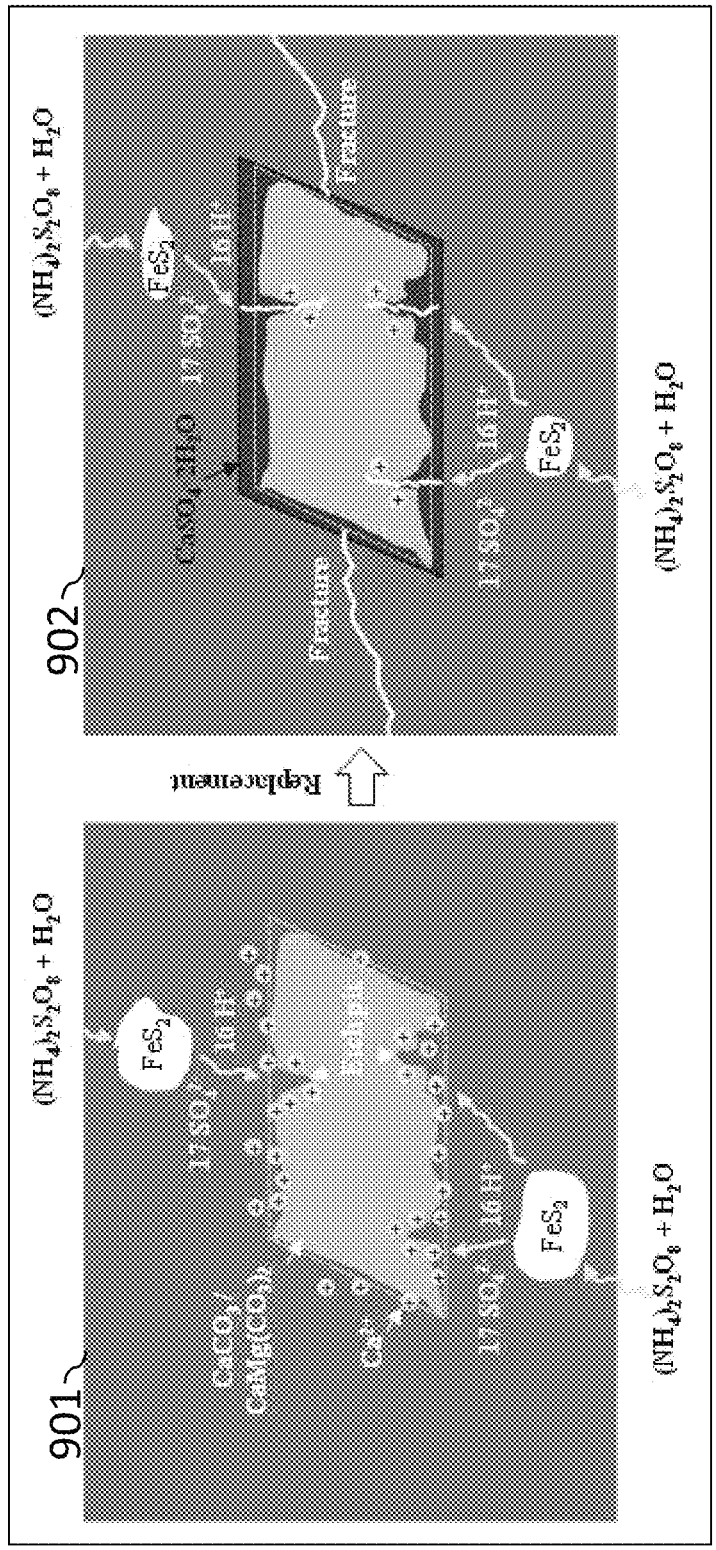

FIG. 9 is a schematic diagram of replacement process and fracturing caused by local volume expansion. Process 901 shows the generation of sulfuric acid and the subsequent dissolution of carbonate minerals, $Ca^{2+}$ ions reflecting the presence of supersaturation solution at mineral-fluid interface. Process 902 shows the gypsum precipitation and volume expansion. This continuous local volume-expanding reaction can generate crystallization pressure that can drive fracturing of the reactive carbonate minerals and surrounding shale matrix. The tips of etch pits at reactive mineral surface can play a key role in stress concentration and allow the growth of fractures into the host. [Plümper 2012; Royne 2015; Malvoisin 2017].

Figure 10A:
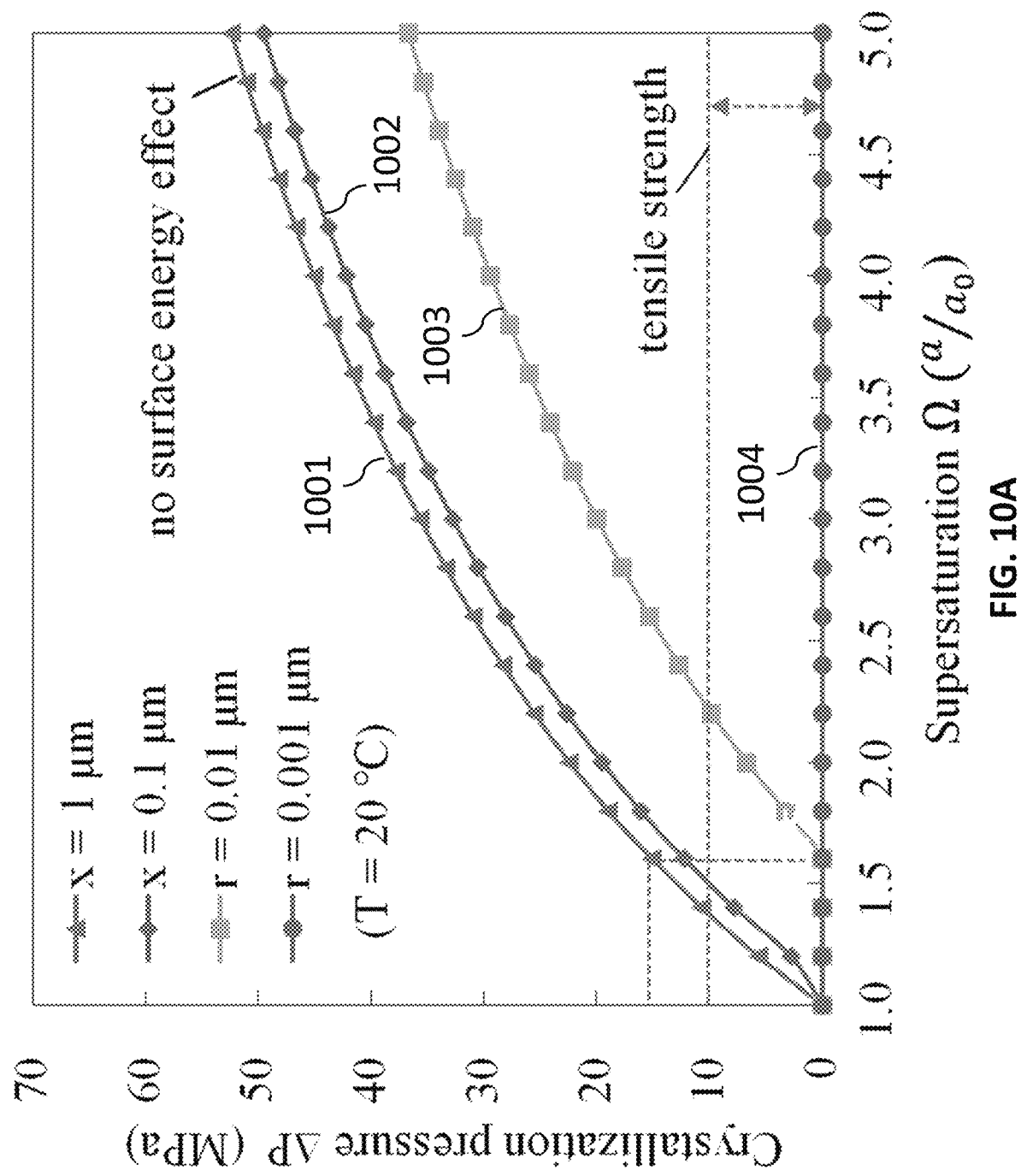
Figure 10B:
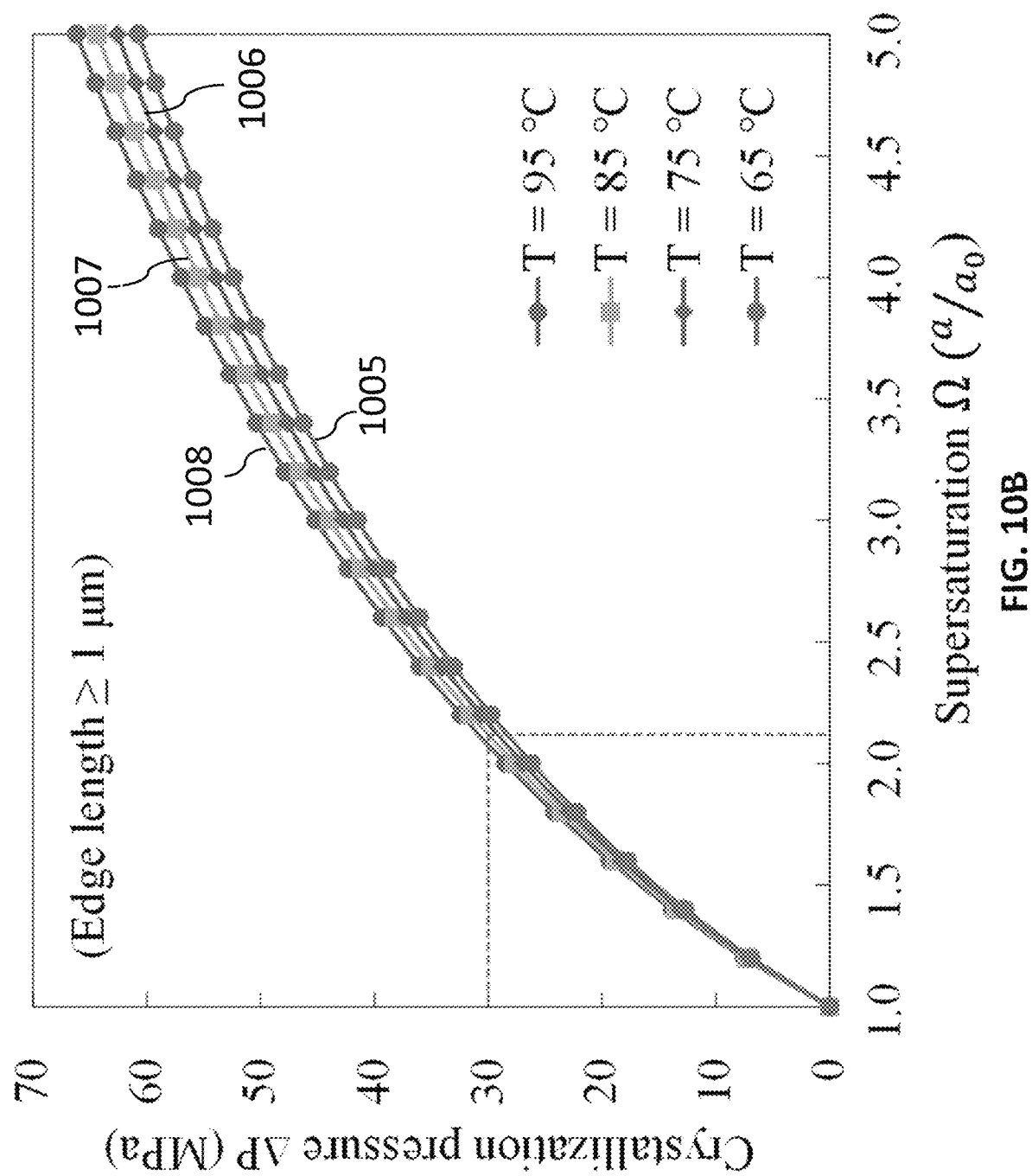

FIGS. 10A-10B are graphs showing the crystallization pressure of gypsum crystals as a function of the degree of supersaturation (calculated with $\gamma_{cl}$=0.08 J/m² [Serafeimidis 2014a] and $V_S$=74.4 cm³/mol). In FIG. 10A, for the unconfined shale samples (tensile strength is <10 MPa), a minor degree of supersaturation can generate swelling pressures sufficient to cause intensive fracturing. In FIG. 10B, at the given supersaturation Ω, effect of temperature on crystallization pressure of gypsum is negligible. It should be note that the temperature dependence of solution activity was not considered in this analysis. The dissolution pores (edge length x≥0.1 µm) was assumed to be rhombohedral, and the inherent nanopores (radius≤0.01 µm) in shale matrix are spherical.

Figure 11:
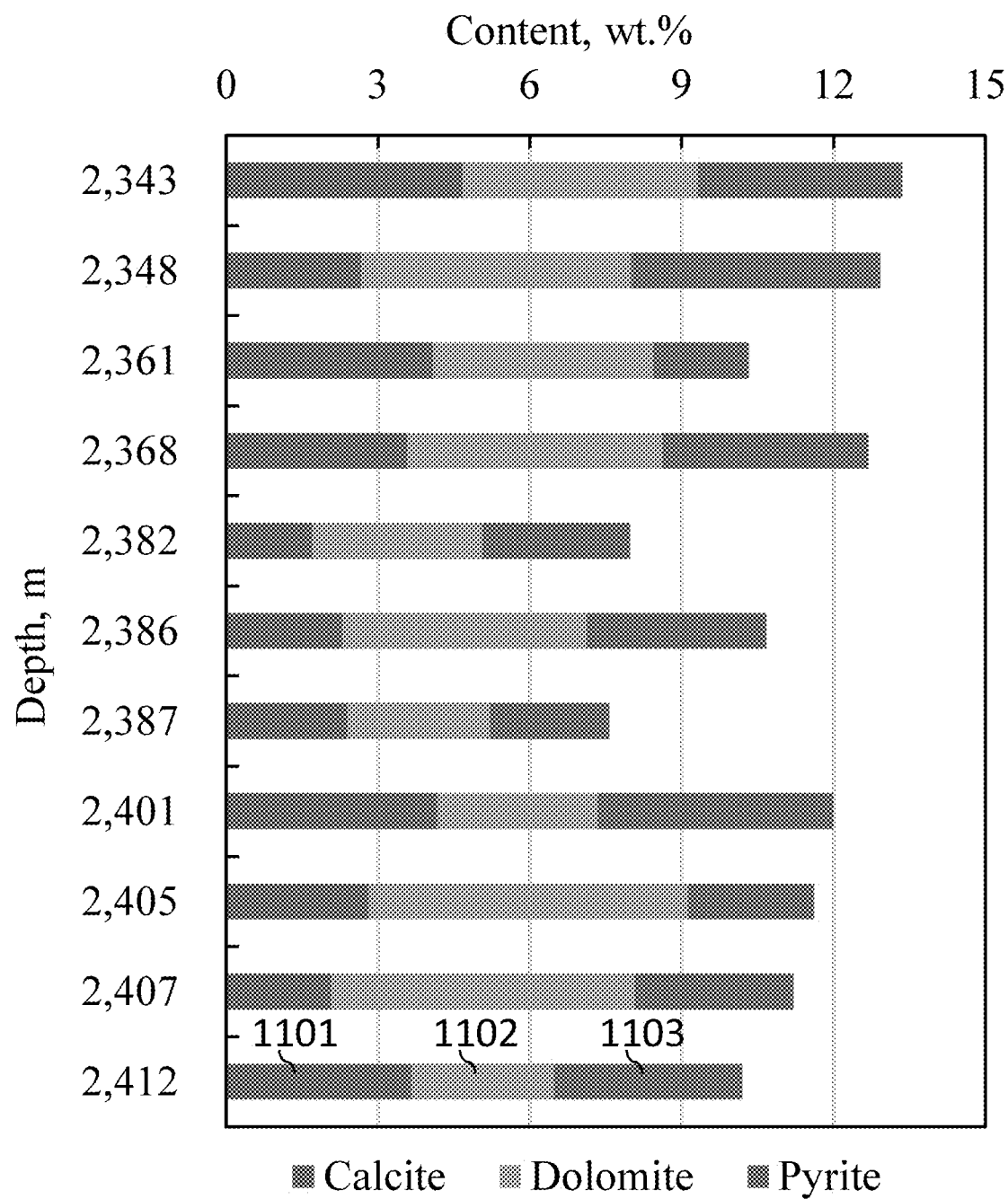

FIG. 11 is a graph that shows the concentration of carbonate minerals and pyrite of lower Silurian Longmaxi shale formation at different depths in a well (denoted as well X1 below) located in Jiaoshiba area, Sichuan Basin, China.

DETAILED DESCRIPTION

The present invention relates to a supplement to hydraulic fracturing to be used in shale reservoirs with carbonate mineral present (up to 30 wt. %). The method includes the addition of sulfate acid or persulfate compound (such as ammonium persulfate ($(NH_4)_2S_2O_8$) to normal fracture fluid. Crystallization pressure exerted by crystal growth within the confined porous structures of materials can induce intensive fracturing or permanent damage. The present invention can be used to generate microfractures during hydraulic fracturing in shale oil and gas reservoirs.

In some embodiments, the method includes gypsum crystallization during mineral replacement reaction during shale fracturing. For instance, aqueous solution of ammonium persulfate ($(NH_4)_2S_2O_8$), a strong oxidizer and one of the most common chemicals in shale fracturing water, can be used to react with the shale rock sample at solid-to-fluid ratio 1:2.5 in an opened system, and the crystallization-induced fractures were observed using CT imaging. The related mineral dissolution and crystal precipitation were examined and analyzed by solution chemistry, X-ray diffraction, and scanning electron microscopy analysis.

Such embodiments showed that for the 38 mm diameter cylindrical shale samples exposed to 10 wt. % $(NH_4)_2S_2O_8$ solution for 10 days, multiscale (m-mm) fracture networks developed during the dissolution of carbonate minerals and gypsum crystals precipitation. The dissolution of carbonate minerals induced by the sulfuric acid, which is associated with pyrite oxidation, produced a mineral-fluid interface supersaturated with respect to $CaSO_4$ within the shale pore system. It allowed the gypsum precipitation in the immediate vicinity of the dissolving carbonate mineral surfaces. Because gypsum had a higher molar volume (74.4 cm³/mol) than calcite (36.9 cm³/mol) and dolomite (64.3 cm³/mol), the local volume-expanding reaction could generate crystallization pressure within shale rocks. Based on the calculation depended on the degree of supersaturation of $CaSO_4$ solution, the crystallization pressure could easily exceed 30 MPa that might provide a sufficient local swelling stress to cause intensive shale microfracturing. This showed how crystallization pressure can be used to improving hydraulic fracturing in shale oil and gas reservoirs.

While the discussion below focuses on 10 wt. % $(NH_4)_2S_2O_8$ solution, other wt. % contents and/or other sulfate acid or persulfate compounds can be utilized in the present invention. Such other sulfate acid or persulfate compounds include, for example, sulfuric acid ($H_2SO_4$), sodium sulfate ($Na_2SO_4$) or potassium sulfate ($K_2SO_4$) solution with pH value less than 6, peroxodisulfuric acid ($H_2S_2O_8$), sodium persulfate ($Na_2S_2O_8$), and potassium persulfate ($K_2S_2O_8$). The range of wt. % content in such solutions can be 1 wt. % to 30 wt. %. The range of the solid-to-fluid ratio in such solutions can be 1 g:1 ml to 1 g:100 ml. The temperature of gypsum precipitation is generally less than 98° C.

Materials and Methods

Shale Samples

The following representative shale samples were utilized. Organic-rich shale samples that possess an organic carbon content of approximate 4.0 wt. % were obtained from gas-producing Longmaxi formation (Eastern Sichuan Basin, China). Four 38 mm diameter by 50 mm length cylindrical core plugs were drilled (denoted as samples A1, A2, B1, and B2) from the same shale block along the rock laminations. Some of the fragmental samples were used to analyze the mineralogy and pore structure. The highly-reactive minerals in shale samples were mainly composed of pyrite (2.7 wt. %), calcite (2.2 wt. %), and dolomite (4.8 wt. %) by X-ray diffraction (XRD) analysis. Before shale-fluid reaction, shale microstructures were determined using mercury intrusion porosity (Hg) and scanning electron microscopy (SEM). These shale samples possessed a mean porosity of around 6% to 7%. Their measurements showed that the majority of pores in these shale samples were less than 0.01 µm in radius, which corresponded to the pores within organic matter and clay minerals.

Chemicals $(NH_4)_2S_2O_8$ was utilized as the representative chemical. As discussed above, other sulfate acid or persulfate compounds can be utilized in the present invention. $(NH_4)_2S_2O_8$ is a very strong oxidizer that is commonly used to decompose the gelling agent in both conventional and shale formation fracturing [Manz 2017], as well as used for industrial cleaning and decontamination. A 10 wt. % $(NH_4)_2S_2O_8$ aqueous solution was utilized. Again, as discussed above, solutions of other content (such as between 1% wt. % and 30% wt. %) can be utilized. Fine power of $(NH_4)_2S_2O_8$ (99% pure, ACS reagent grade) was purchased from Loudwolf industry and scientific. Deionized water (conductivity<3 µS/cm) from water purification system was used to prepare the 10 wt. % $(NH_4)_2S_2O_8$ aqueous solution, which possessed a redox potential ($E_h$) of 974 mV through the direct measurement using Thermo Scientific Orion ORP electrodes. Similar to Fenton reaction, persulfate can also be self-decomposed (activation) into sulfate radicals ($SO_4^-$) and produce stronger oxidation potential through transition metals such as iron or manganese. [Zhao 2013; Liu 2014]. Because the presence of iron-containing minerals, such as pyrite ($FeS_2$) and chlorite, the stronger oxidizing sulfate radicals may be generated during the shale-$(NH_4)_2S_2O_8$ reaction.

3D Geometry of Reaction Induced Microfractures and Mineralogy Alteration

Because this low-magnification in-situ CT imaging was incapable of providing the detail information of micrometer-scale induced fractures, a high-resolution micro-CT (µCT, MicroXCT-400) with a spatial resolution of ~2 µm was used for investigating the 3D geometry of reaction induced microfractures on the 2 mm diameter cylindrical subsamples of previous cylindrical shales undergoing hydration or oxidation reaction of 10 days. For 3D visualization of the µCT reconstructed data (more than 950 slices per sample), the commercial software Avizo was utilized. Before the segmentation of objects (microfractures), images were enhanced by applying median filter for noise reduction, and then manual adjustment of thresholds was used to identify and separate the objects in these images. As the highly interactive display and visual inspection by user, the manually selected thresholds were considered to be correct. [Bultreys 2016]. Avizo volume rendering also provided the most intuitive and powerful techniques for high quality 3D visualization of interesting objects.

Reaction induced mineralogy alteration were studied using X'Pert PRO MPD X-ray diffractometer and Carl Zeiss Sigma 300 field-emission scanning electron microscopy on the subsamples of reacted shale samples B1. A secondary electron mode (SE) was used to study the precipitation of crystals morphology and distribution. Elemental components of minerals were also identified using energy-dispersive spectroscopy (EDS, QUANTAX XFlash 6130) in SEM.

Macroscopic Observations of Reaction-Driven Cracking

Since the high abundance of clay minerals in shale samples, rock cracking induced by clay hydration may occur. For example, the presence of hydration-induced fractures in shales placed in deionized water has previously been observed [Roychaudhuri 2013; Ghanbari 2015; Roshan 2015], which may obscure the underlying mechanism of reaction-driven cracking. In the first test, therefore, an oxidant-free comparative experiment in which 38 mm diameter by 50 mm length cylindrical shale samples (A1 and A2) were exposed to deionized water was conducted. A second test was performed on sample B1 and B2 to investigate the effect of oxidation-induced dissolution reaction in 10 wt. % $(NH_4)_2S_2O_8$ aqueous solution on shale cracking. All these shale-fluids reaction experiments were conducted at a room temperature in an opened system (solid-to-fluid ratio 1:2.5).

FIGS. 1A-1F and FIGS. 2A-2J show unconfined cylindrical core samples (50 mm in height, 38 mm in diameter) before and after the exposure to deionized water and 10 wt. % $(NH_4)_2S_2O_8$ solution, respectively.

Because all the shale samples utilized had reached the extremely high thermal maturity, the water uptake of these samples occurred easily. For example, the water saturation of sample A1 was more than 90% in the first three days of exposure to deionized water. Owing to the high content (~30 wt. %) of clay minerals that provide swelling stress after water imbibition, one or two fractures parallel to lamination could be observed on shale sample A1 (FIGS. 1A-1C) and A2 (FIGS. 2A-2E). However, these fractures did not significantly alter shale samples.

In contrast to the shale-water interaction, many fractures that presented a good homogenous distribution are visible on sample B1 (FIGS. 1D-1F) and B2 (FIGS. 2F-2J) after the exposure to 10 wt. % $(NH_4)_2S_2O_8$ solution. Especially, the spacing of fractures in most of the observed area on sample B1 was less than 1 mm, and these fractures intersected the entire sample surface. Evolution of the fracture initiation and spontaneous propagation of sample B2 with time are displayed in FIGS. 2F-2J. Results of time-lapse in-situ CT imaging showed that concurrent generation of new fractures and increase in apertures for existing fractures occurred within the reaction time of 10 days, and the maximum apertures of induced fractures were more than 1 mm. This indicated that the interactions of shale highly-reactive phases with $(NH_4)_2S_2O_8$ solution could induce mechanical forces that may easily exceed the shale tensile strength, and were sufficient to the fracture initiation and spontaneous propagation.

3D Geometry of Induced Microfracture Network

Figures 3A, 3B, 3C:
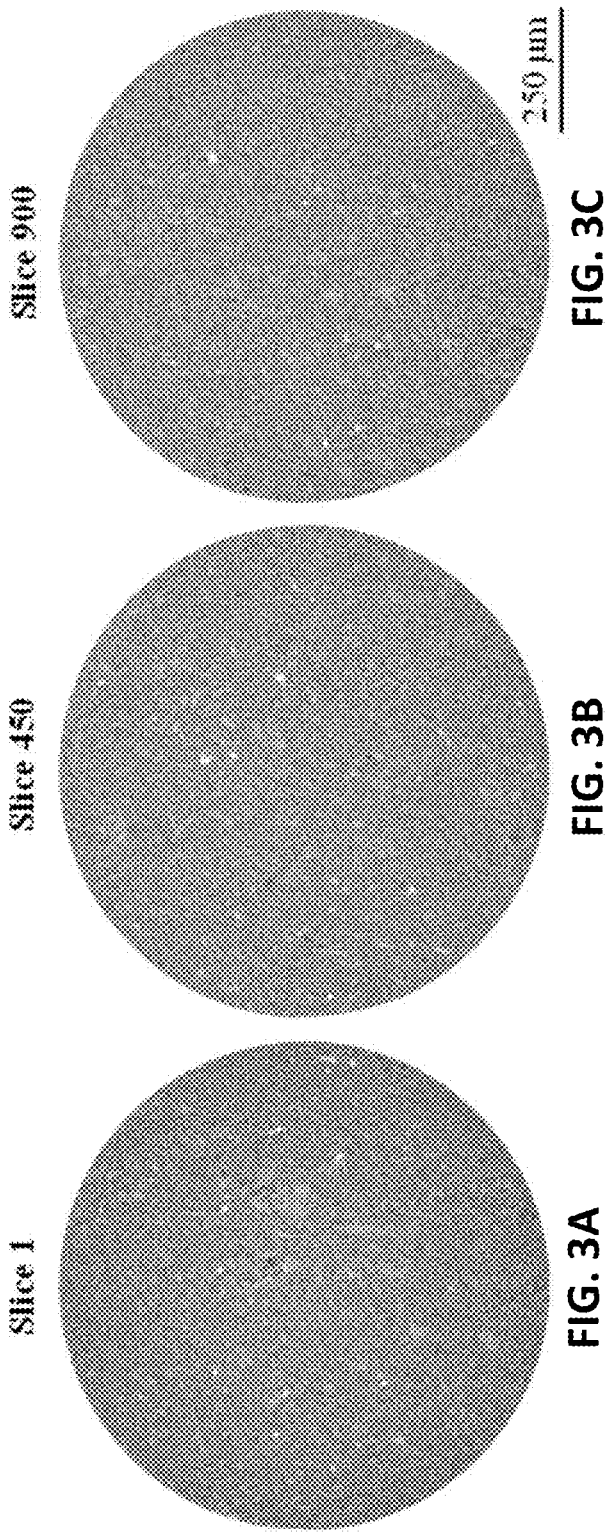
FIGS. 3A-3C are high resolution (2.0 μm/pixel) μCT imaging of slices (1, 450, and 900) taken from the unconfined cylindrical core sample shown in FIGS. 1B-1C (i.e., the core sample after exposure to deionized water for ten days). No microfractures was visible in the shale sample A1, as shown in FIGS. 3B-3C.
Figures 3D, 3E, 3F:
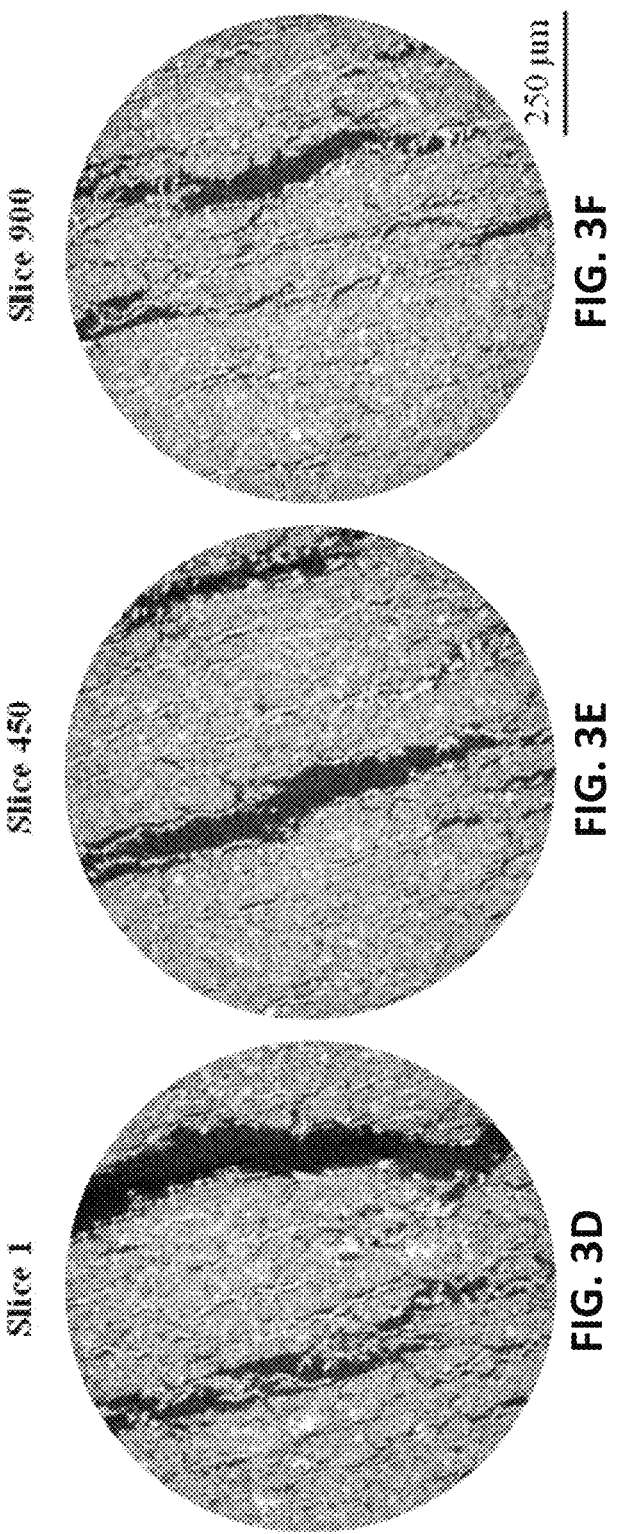
FIGS. 3D-3F are high resolution (2.0 m/pixel) μCT imaging of slices (1, 450, and 900) taken from the unconfined cylindrical core sample shown in FIGS. 1E-1F (i.e., the core sample after exposure to a 10 wt. % $(NH_4)_2S_2O_8$ solution for ten days). Conversely to FIGS. 3A-3C, as shown in FIGS. 3E-3F, the shale sample B1 showed at least two generation of hierarchical and interconnected dense microfractures, which illustrated the possibility of microfracture networks. However, only few micrometer-scale pores arising from the minerals dissolution were visible in sample B1.

Imaging using high resolution (2.0 µm/pixel) µCT allowed the 3D visualization of shale internal microstructure to be displayed before and after reaction (FIGS. 3A-3F and FIGS. 4A-4B). The samples used for µCT imaging were cut from sample A1 and sample B1 that had undergone the shale-fluid reaction for 10 days. Despite FIGS. 1A-1C and FIGS. 2A-2E present the water-induced fractures, microfractures were not detected in µCT images as shown in FIGS. 3A-3C. This may be attributed to the small number of these microfractures. For the subsample of reacted sample B1, however, many microfractures were visible in all the µCT slices, and their apertures ranged from few µm to 100 µm (FIGS. 3D-3F).

FIG. 4A shows a 3D rendering of the reaction induced microfractures and pore network. At the micrometer-scale, microfractures presented a good connectivity, as indicated by FIG. 4B, and their spacing was less than 100 µm. Since the microfractures were segmented, their volume could be easily measured by Avizo. Statistics measurements shows that these dense microfractures possessed a volume fraction of 13.9%, which was much greater than the reaction-induced pore volumes (e.g., 1.1%).

Mineral Dissolution and Gypsum Crystal Precipitation

Evolution of Solution Chemistry During Shale-Fluid Interaction

Figure 5A:
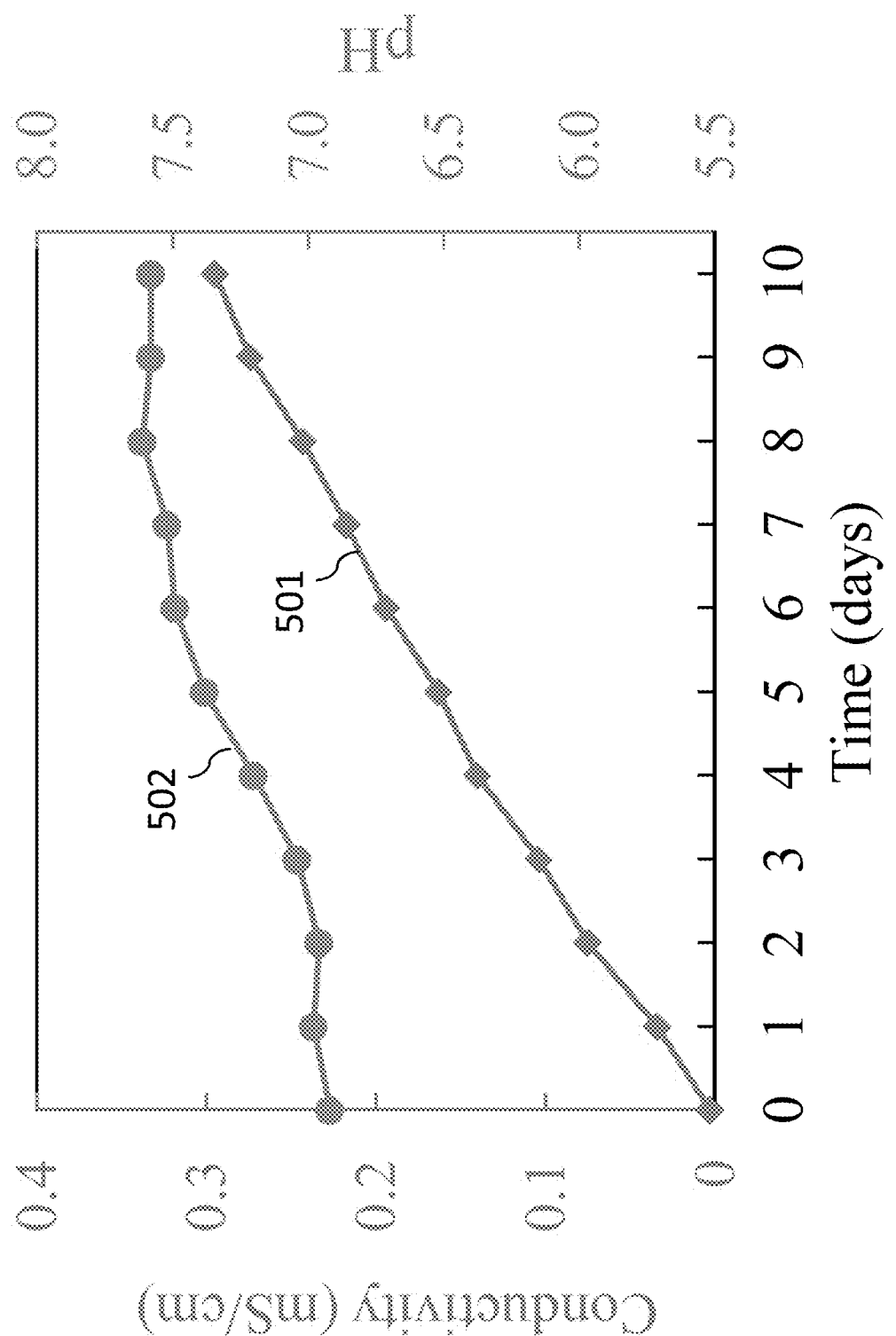
FIG. 5A is a graph showing the conductivity (plot 501) and pH (curve 502) during the interactions of the core samples (shown in FIGS. 1A-1C) with deionized water over ten days.
Figure 5B:
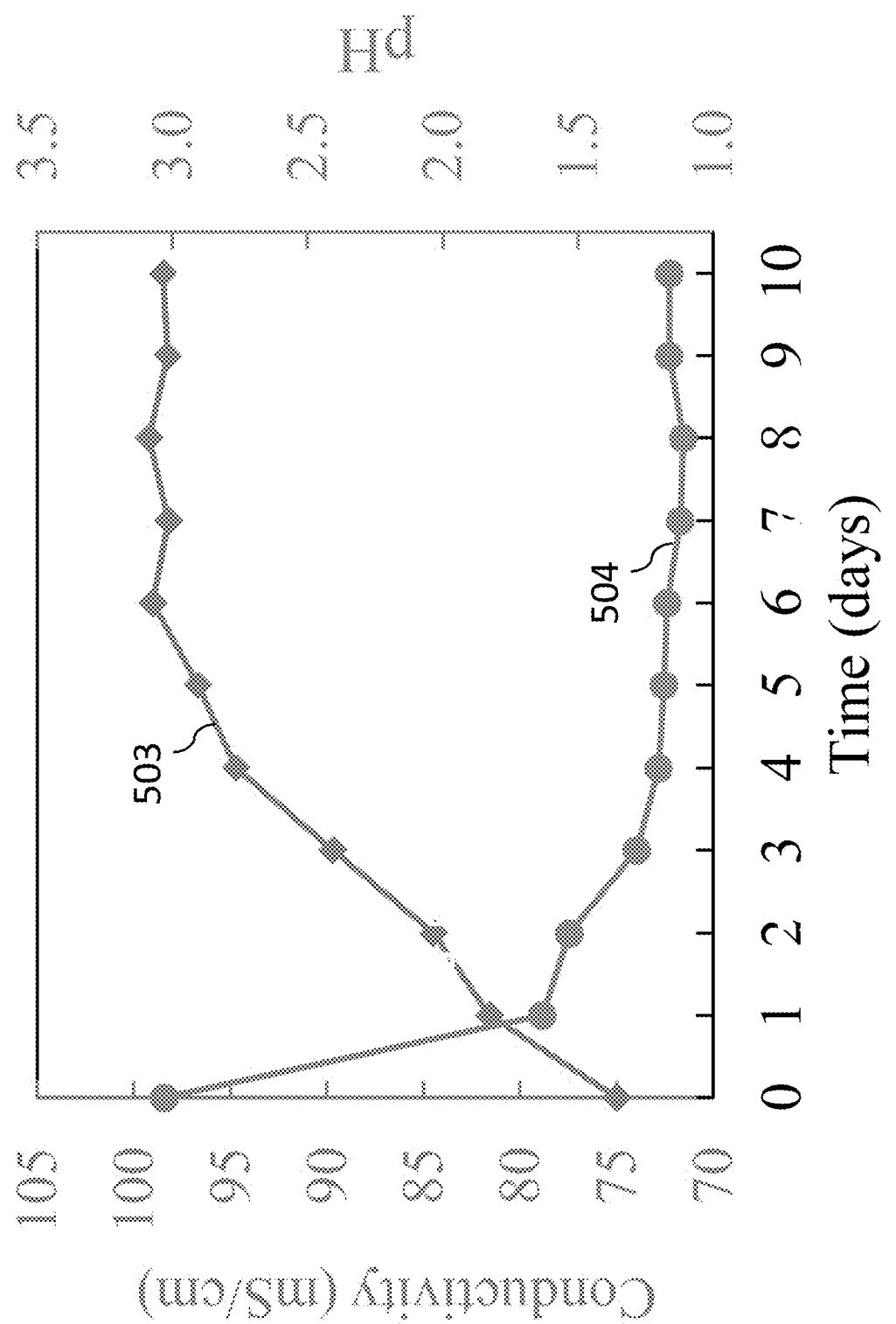
FIG. 5B is a graph showing the conductivity (plot 503) and pH (curve 504) during the interactions of the core samples (shown in FIGS. 1D-1F) with a 10 wt. % $(NH_4)_2S_2O_8$ solution over ten days.

FIGS. 5A-5B are graphs showing the evolution of conductivity and pH of aqueous solution during the interactions of shale samples (A2/B2) with the deionized water and 10 wt. % $(NH_4)_2S_2O_8$ solution, respectively. pH and conductivity, which are directly related to the concentration of ions in the water, were recorded using benchtop pH/conductivity meter (Thermo Scientific Orion Star A215) to monitor the geochemical changes during the shale-fluid reaction. Time-lapse in-situ CT imaging was used to dynamically visualize the reaction-driven cracking in 24-hour intervals. This was conducted at the NL3000 Ceretom X-ray CT scanner with a space resolution of 0.35 mm and a minimum thickness of 1.25 mm. It provided a small series (40 slices) of two cross-section images for every CT scanning.

In shale-water interaction (shown in plots 501-502 of FIG. 5A), the conductivity showed a very slight increase with reaction time (from 0.003 to 0.3 mS/cm); the same was observed for solution pH. For the shale-$(NH_4)_2S_2O_8$ reaction (shown in plots 503-504 of FIG. 5B), the solution conductivity showed a significant increase during the first six days of reaction (from 74.9 to 99.0 mS/cm), and the pH decreased from 3.0 to 1.1 at the same period; after that, an increase in reaction time did not result in change in both conductivity and pH, indicating the system reaching an equilibrium. These reaction processes were in good agreement with the evolution of reaction-driven cracking on sample B2 as shown in the time-lapse in-situ CT imaging (FIGS. 2F-2J).

In many case, the conductivity is linked directly to the ion concentrations in solution. The minerals dissolution, salt precipitated in shale pores [Ghanbari 2015], and cation exchange from clay minerals [Keller 1989] are the three possible source of ions. Therefore, the very slight increase of conductivity (~0.3 mS/cm) after the shale-water interaction for 10 days may be related to the ions released from the salt and cation exchange, whereas the most important ions source in $(NH_4)_2S_2O_8$ solution was attributed to the dissolution of reactive minerals. Such evolution features of $(NH_4)_2S_2O_8$ solution chemistry suggest that the dissolution of reactive minerals may be the source of the mechanical forces that provide tensile stress for the fracture initiation and spontaneous propagation.

Mineralogy Alteration after Reaction

Figure 6A:
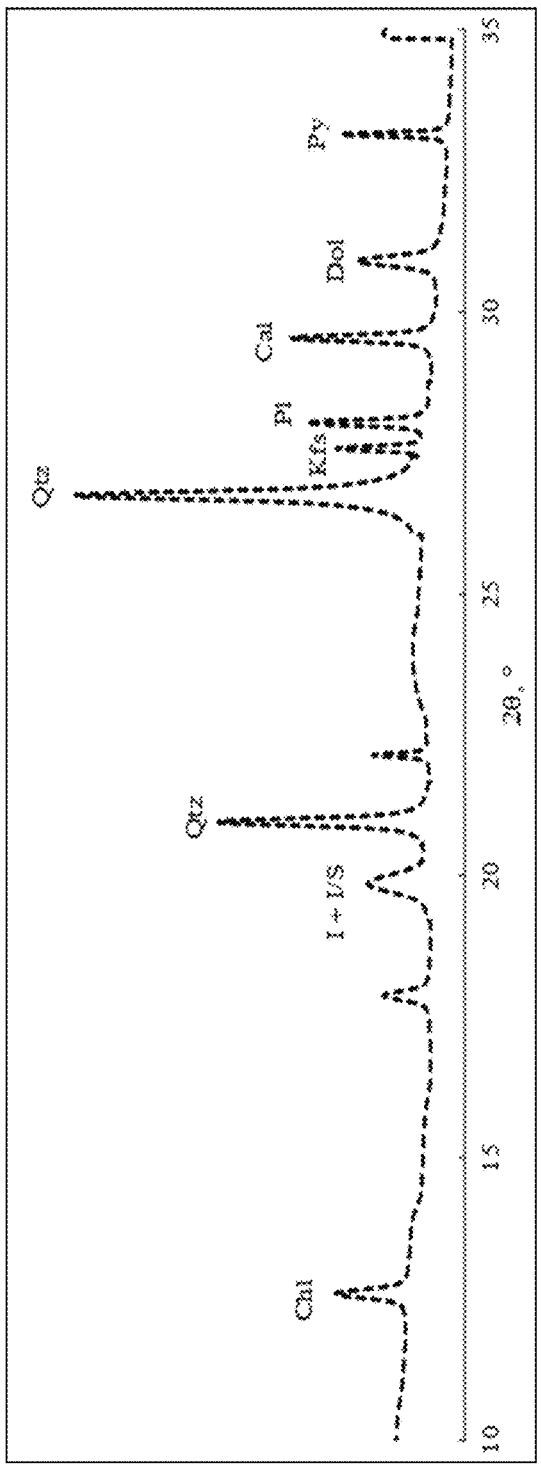
FIG. 6A is a graph showing the mineralogy of the core same (shown in FIG. 1D) before exposure to the 10 wt. % $(NH_4)_2S_2O_8$ solution.
Figure 6B:
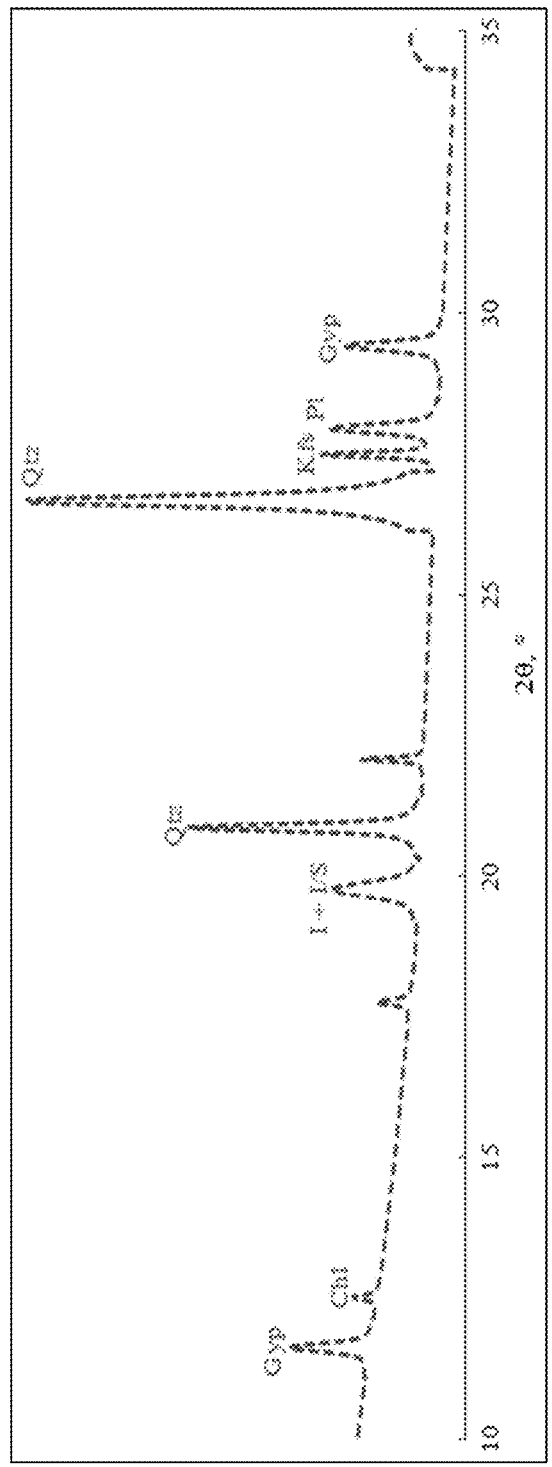
FIG. 6B is a graph showing the mineralogy of the core same (shown in FIGS. 1E-1F) after exposure to the 10 wt. % $(NH_4)_2S_2O_8$ solution for ten days. XRD results confirm the complete dissolution of carbonate minerals and the presence of newly-formed gypsum. (For FIGS. 6A-6B.

According to XRD results, the unreacted shale sample (FIG. 6A) prior to reaction had a mineral composition of 2.7 wt. % pyrite (Py, $FeS_2$), 2.2 wt. % calcite (Cal, $CaCO_3$), 4.8 wt. % dolomite (Dol, $CaMg(CO_3)_2$), 30.2 wt. % clay, 46.2 wt. % quartz (Qtz), 5.5 wt. % K-feldspar (Kfs), and 8.5 wt. % plagioclase (Pl); the clay minerals consist of chlorite (2.8 wt. %), illite (27.1 wt. %), and illite/smectite mixed layer (0.3 wt. %). When the shale sample (B1) reacted with $(NH_4)_2S_2O_8$ for 10 days, the pyrite, calcite, and dolomite were not detectable as shown in FIG. 6B, and the content of chlorite decreased from 2.8 to 1.1 wt. %; the other minerals in shale, however, seemed to be non-reactive. The XRD result of reacted shale sample also showed the presence of gypsum (Gyp, $CaSO_4 \cdot H_2O$) that possessed a content of 6.0 wt. %, indicating the transformation of carbonate into sulfate minerals.

SEM Observations

Pore-Scale Distribution of Highly-Reactive Minerals Prior to Reaction

Previous studies of shale-fluid interactions [Jin 2013; Heidari 2017; Bao 2017] indicated that pyrite, calcite, and dolomite were the most reactive minerals. These results were also supported by the XRD analysis as shown in FIGS. 6A-6B. SEM was utilized to characterize these highly-reactive minerals. FIGS. 7A-7F show the back-scattered electron (BSE) images of highly-reactive minerals in unreacted shale sample. The images were perpendicular to the bedding plane.

Owing to the anoxic depositional environment, pyrite was commonly observed in shale sample. In the SEM images of FIGS. 7A-7F, pyrite existed in two forms, e.g., framboids and euhedral crystal. Discrete framboids had a greater particle size that ranged from 1 to 10 μm in length and were also the more widespread, as shown in FIG. 7A. The deep anoxic waters were also commonly considered to play an active role in the formation of calcite and dolomite in shale formation. [Drake 2015; Vasconcelos 1999]. Although the calcite had a content of 2.2 wt. %, only few of this mineral was observed clearly by SEM imaging. This may be attributed to the small particle size (e.g., less than 5 μm) as shown in FIG. 7B. In a strong contrast, the dolomite grains were commonly observed in the form of coarse sized rhombohedral crystals, ranging from 10 to 40 μm (FIGS. 7C-7F). Due to the minor density difference between dolomite and the other minerals, only a small amount of dolomite grains were clearly observed by BSE type imaging. Results of EDS analysis indicated that Fe-bearing (ferroan dolomite, $Ca(Mg,Fe)(CO_3)_2$) was the relatively common variety of dolomite in shale sample. Because of the presence of iron (II), it became more favorable for the oxidation-related dissolution of dolomite during shale-$(NH_4)_2S_2O_8$ reaction.

Morphology and Size of Gypsum Crystal Precipitation Post Reaction

The presence of gypsum as shown in XRD result (FIGS. 6A-6B) was also supported by the SEM imaging and elemental analysis performed on the reactive surface of sample B1. It provided many clear evidences of gypsum crystals. Result of SEM images showed that the commonly observed gypsum precipitation typically took place in the form of crystal clusters (10-30 μm) (FIG. 8A and FIG. 8D) and polyhedral-shape grainy crystals ranging from several hundreds of nanometers to few micrometers in size (FIGS. 8B-8C and FIGS. 8E-8F). Moreover, these gypsum crystals were not visible in the fine nanopores.

Replacement of Carbonate Minerals by Gypsum Crystals

Dissolution of Carbonate Minerals Coupled to Gypsum Precipitation

Pyrite ($FeS_2$) consists of a ferrous ($Fe^{2+}$) cation and an $S_2^{2-}$ anion. Once the mineral is in contact with oxidants, e.g., dissolved oxygen in water [Simate 2014] and hydrogen peroxide aqueous solution [Chen 2017], pyrite oxidation and formation of sulfuric acid can take place at the same time. The associated sulfuric acid during pyrite oxidation were commonly considered to be a strong acidic aqueous solution [Evangelou 1995], where the pH value can be less than 2. $(NH_4)_2S_2O_8$ is a very strong oxidizer used for industrial cleaning and decontamination. Its oxidation potential, at 2.0 V [Manz 2017], is stronger than both hydrogen peroxide ($H_2O_2$, 1.8 V) and oxygen. Previous studies have demonstrated the generation of sulfate ($SO_4^{2-}$) and acid ($H^+$) during the reaction of pyrite with persulfate. [Liang 2010]. The ability of pyrite to generate $SO_4^{2-}$ and $H^+$ can be estimated through the following stoichiometry:

$$2FeS_2 + 15S_2O_8^{2-} + 16H_2O \rightarrow 2Fe^{3+} + 34SO_4^{2-} + 32H^+ \qquad (1)$$

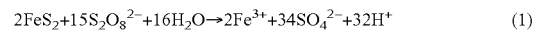

The observed stoichiometric ratio of $SO_4^{2-}$ or $H^+$ per pyrite loss is greater than 15. Therefore it can be interpreted that during the shale-$(NH_4)_2S_2O_8$ solution interaction the low pH value (<1.5) and significant increase in conductivity as shown in FIG. 5B can be attributed to the formation of associated sulfuric acid. Calcium sulfate belongs to the group of salts with low water solubility (less than 0.3 g/100 ml at 25° C.). In the presence of large amount of $SO_4^{2-}$ and $H^+$ ions released from pyrite oxidation and persulfate decomposition, concurrent carbonate minerals dissolution and gypsum precipitation in shale pores may occur in the interaction of pyrite-containing shale sample with $(NH_4)_2S_2O_8$ solution. Such coupled processes can take place via the reactions (2)-(4):

$$2H^+ + CaCO_3 \rightarrow Ca^{2+} + H_2O + CO_2 \quad (2)$$

$$4H^+ + CaMg(CO_3)_2 \rightarrow Ca^{2+} + Mg^{2+} + 2H_2O + 2CO_2 \quad (3)$$

$$SO_4^{2-} + Ca^{2+} + 2H_2O \rightarrow CaSO_4 \cdot 2H_2O \quad (4)$$

The stoichiometry in the coupled dissolution-precipitation reactions (2)-(4) shows that every two moles of carbonate minerals can merely react with 3 moles of $H_2SO_4$. In the reactions (1)-(4), the fluid/rock ratio is estimated at 2.5. In other words, there is plenty of $SO_4^{2-}$ and $H^+$ ions present when these reactions finish. It leads to a deduction that these molar ratios may assist the complete dissolution of carbonate minerals and precipitation of calcium sulfate crystals. This has been confirmed by extensively measurements of pH and conductivity in FIG. 5B, which indicates that the dissolution reaction of carbonate minerals coupled to gypsum precipitation completed after 6 days.

Replacement Process and Volume-Expanding Reaction

The coupled dissolution-precipitation process (reactions (2) to (4)) is typical of mineral replacement reactions [Putnis 2002; Putnis 2009; Putnis 2013; Ruiz-Agudo 2014], in which carbonate minerals are replaced by the gypsum product. The elementary mechanism behind the so-called replacement reactions is that the dissolution of one phase (e.g., calcite and dolomite) after exposure to aqueous solution produces a mineral-fluid interface ("boundary layer") supersaturated with respect to another phase (e.g., calcium sulfate). In the mineral-fluid interactions, such as olivine hydration and carbonation [Kelemen 2012] and the coupled dissolution of carbonate minerals and the precipitation of gypsum [Offeddu 2014; Ruiz-Agudo 2015], it is a general situation in which the solution at the boundary layer become supersaturated with respect to the reaction product, whereas the bulk solution remains unsaturated.

Experimental measurements of $Ca^{2+}$ concentration in bulk solution performed as set forth by Ruiz-Agudo et al. [Ruiz-Agudo 2015] confirmed the presence of supersaturated boundary layer during the replacement reaction of calcite by gypsum. It is therefore reasonable that the carbonate minerals in the shale samples can be replaced by gypsum via interface-coupled dissolution-precipitation reaction. When calcite and dolomite come into contact with sulfate-bearing acidic solution, the dissolution of these minerals produces a supersaturated $CaSO_4$ solution at the reactive mineral surface (process 901 of FIG. 9). Gypsum precipitation will take place immediately at the dissolving carbonate minerals surfaces. It is experimentally known that reactions of calcite and dolomite single crystals with unconfined sulfate-bearing acidic solution (pH ranging from 1 to 6) also allow the gypsum precipitation in the immediate vicinity of the dissolving parent mineral surfaces. [Offeddu 2014; Ruiz-Agudo 2015]. This means that the formation of gypsum precipitation is much faster than in the equilibrium between the boundary layer and the bulk solution by diffusion. Compared with the unconfined solution, the transport of reaction products away from the reacting site is much slower within shale nanopores. Thus, during the shale-$(NH_4)_2S_2O_8$ reaction the thickness of supersaturated boundary layer and their corresponding degree of supersaturation may be higher. This indicates that mineral replacement reaction is the elementary mechanism behind the carbonate minerals dissolution and gypsum precipitation processes (process 902 of FIG. 9).

Because gypsum has a higher molar volume (74.4 cm³/mol) than calcite (36.9 cm³/mol) and dolomite (64.3 cm³/mol), the precipitation of gypsum crystals can completely infill the etch pits or pores that arise from the dissolution of carbonate minerals (process 902 of FIG. 9). That is why only minor micrometer-scale pores within the reacted shale matrix were visible using μCT imaging (FIGS. 3D-3F and FIGS. 4A-4B). However, a significant increase in volume (102% for the conversion from calcite-gypsum, 16% for dolomite-gypsum conversion) occurs during the replacement reaction, and this continuous local volume-expanding reaction can generate crystallization pressure that drives fracturing of the reactive carbonate minerals and surrounding shale matrix. Thus, there were dense fractures in reacted shale samples (as shown in prior figures herein). These new reactive surfaces generated by fracturing also provide additional fluid pathway that may greatly accelerate the dissolution-precipitation process. [[Plümper 2012; Zhu 2016; Royne 2015]. As demonstrated by XRD (FIGS. 6A-6B), the calcite and dolomite in shale sample is completely replaced by gypsum due to the presence of reaction-induced fracturing.

Crystallization Pressure and Shale Fracturing by Gypsum Crystal Growth

When the confined gypsum crystal precipitating in dissolution etch pits or pores come into contact with the supersaturated solution, it continues to grow and generate crystallization pressure that may induce shale fracturing (as shown in prior figures herein).

The pressure exerted by salt or solid product crystallization in porous materials can be given by the following expression [Steiger 2005b]:

$$\Delta P = \frac{RT}{V_S} \ln \Omega - \gamma_{cl,i} \frac{dA_i}{dV} \quad (5)$$

where $\Delta P$ is the crystallization pressure (MPa), R is the gas constant (R=8.31 MPa cm³ mol⁻¹ K⁻¹), T is the temperature (K), $V_S$ is the molar volume of the growing crystallization phase (cm³/mol), $\Omega$ is the degree of supersaturation of the pore solution, $\gamma_{cl,i}$ is the surface free energy of the crystal-liquid interface at crystal face i (J/m²), and $dA_i$ and $dV$ are the surface area at the ith face and volume of the crystal, respectively. Generally, $\Omega$ is defined as $a/a_0$, where a and $a_0$ are the solute activity of the supersaturated solution and saturated solution at a standard condition, respectively. The pore space associated with carbonate minerals dissolution is assumed to be rhombohedral geometry as show in FIGS. 7A-7F, whereas the inherent nanopores (r<0.1 μm) in shale matrix are spherical.

Further considering a isotropic surface free energy, the following expressions for the calculation of crystallization pressure of crystal growth in rhombohedral and spherical pores are obtained [Steiger 2005b]:

$$\Delta P = \frac{RT}{V_S} \ln \Omega - \frac{4\gamma_{cl}}{x} \quad (6)$$

$$\Delta P = \frac{RT}{V_S} \ln \Omega - \frac{2\gamma_{cl}}{r} \quad (7)$$

where x and r are the edge length and radius of pores (m), respectively. Equations (6) and (7) were extensively used to calculate crystallization pressure for various supersaturated aqueous solutions in porous media [Steiger 2005b; Steiger 2005a; Noiriel 2010; Steiger 2008], such as NaCl, NaNO$_3$, Na$_2$SO$_4$, and MgSO$_4$ solutions. The equations indicated that the degree of supersaturation was limiting the maximum pressure.

Although it is nearly impossible to probe this degree of supersaturation within pores due to the presence of boundary layer at the reacting mineral surface, which causes the saturation index inside a boundary layer to differ from the bulk solution [Putnis 2005], the crystallization pressures at various degree of supersaturated pore solution can be estimated using equations (6) and (7). FIGS. 10A-10B show the calculated crystallization pressure at 20° C. in supersaturated pore solutions. Because gypsum is commonly precipitated at temperature less than 98° C. [Kan 2009; Al-Khaldi 2011; Meijer 1984], these calculations were carried out at temperatures ranging from 20-95° C. The parameters of $\gamma_{cl}$=0.08 J/m$^2$ [Serafeimidis 2014a] and $V_S$=74.4 cm$^3$/mol were used for their calculations in this study.

Prior to the reaction, the majority of pores in the shale samples were less than 0.01 μm in radius. It is obvious from the data shown in FIG. 10A (plots 1001-1004 for x=1 μm, x=0.1 μm, r=0.01 μm, and r=0.001 for μm, respectively) that these gypsum crystals are prone to grow in larger pores than in small pores. Thus, the fine nanopores (r≤0.01 μm) may be not infilled with crystals until the presence of a much higher supersaturated pore solution. For example, the precipitation or growth of gypsum crystals will not occur in the pores of r=0.01 μm until the supersaturation greater than 1.6.

FIG. 10A also shows that for a given supersaturated solution the large crystal growth in pores of r≥0.1 μm can build up a much larger crystallization pressure than that in fine nanopores due to the influence of surface free energy of the crystal-liquid interface, which can reduce crystallization pressure by $2\gamma_{cl}/r$. Therefore, the gypsum crystals are expected to growth in large pores (r≥0.1 μm). Fortunately, the SEM images of shale samples showed that both of the observed calcite and dolomite grains were larger than 0.1 μm as shown in FIGS. 7A-7F and in Chen 2017.

When dissolution of these minerals occurs, it provides a good pore space for the growth of large gypsum crystals and subsequently generates considerable crystallization pressure. Typically, tensile strength of shale is less than 10 MPa. [Li 2016; Mokhtari 2014]. Hence, even at a low degree of supersaturation (Ω≤1.6), the corresponding crystallization pressure can induce sufficient tensile stress to cause fracturing of the unconfined shale samples. See FIGS. 1A-1F and FIGS. 2A-2J. For a supersaturated pore solution of Ω=5.0, the crystallization pressure was estimated to exceed 50 MPa. For a subterrestrial sulphatic claystones containing anhydrite (CaSO$_4$), gypsum and water, [Serafeimidis 2014b] also obtained a similar crystallization pressure in the range of 20-50 MPa, which explained the substantial structural damage of tunnels.

Because many of the shale formations (e.g., Marcellus, Barnett, Bakken, and Wolfcamp) have a temperature of 66-110° C. [Jai 2017], FIG. 10B concerns the effect of temperature on crystallization pressure. At the given supersaturation f ranging from 1 to 5 and temperatures ranging from 65° C. to 95° C. (plots 1005-1006 corresponding to 65° C., 75° C., 85° C., and 95° C., respectively), their effects are less important. Clearly, the supersaturation is the most direct factor controlling the crystallization pressure and the subsequent fracturing.

The question arises, whether the degree of supersaturation can be readily met for fracturing subsurface rocks during shale-fluid reactions. Ping et al. [Ping 1992] derived another equivalent expression to express the supersaturation in terms of the ratio of activity product of reactants. Thus any reactant activity increase will influence the value of Ω. [Abdel-Aal 2004]. SO$_4^{2-}$ ions in pore solution comes from the reaction of pyrite with (NH$_4$)$_2$S$_2$O$_8$ solution. As mentioned above, due to SO$_4^{2-}$ far in excess of the amount of ions required to form gypsum crystals, its concentration continuously increase with time is the basic assurance of the continuous increase of crystallization pressure.

Implication for Hydraulic Fracturing in Shale Reservoirs

All the two reaction-driven cracking experiments in this study were performed on unconfined shale samples, which may overestimate the extent of shale cracking caused by expansive pressure. In order to estimate the feasibility of reaction-induced shale fracturing within subsurface formation, Longmaxi shale formation in Jiaoshiba area, Sichuan Basin, China was taken as an example. It is the first major shale gas play in China. FIG. 11 shows the typical mineralogy of Longmaxi shale formation in well X1 with a depth of 2343-2412 m. Owing to the anoxic depositional environment [Drake 2015; Vasconcelos 1995], pyrite, calcium and dolomite are commonly observed in shale formation. When these subsurface shales in well X1 come into contact with the fracturing water containing sufficient (NH$_4$)$_2$S$_2$O$_8$, the amount of highly-reactive minerals can be readily met for local volume-expansion reaction by gypsum replacement.

The average temperature of this formation for well X1 is 87° C., thus providing a favorable temperature for the formation of gypsum crystals. On the other hand, the minimum horizontal stress is 48.6-49.9 MPa, and initial reservoir pore pressure is 36.3-37.4 MPa. When the Biot coefficient is assumed to be 0.55 [Gutierrez 2015], an effective minimum horizontal stress of 28-30 MPa is obtained. According the calculation in FIG. 10B, the crystallization pressure caused by volume-expansion reaction can easily exceed 30 MPa when the degree of supersaturation is greater than 2.2.

Therefore, the local volume-expansion reaction is a method that can be used to generate microfractures during hydraulic fracturing in shale oil and gas reservoirs. The spacing of reaction induced fractures is close to the gypsum crystals scale, leading to the much-more-denser secondary fracture networks than that from conventional fracturing. Moreover, the micrometer-scale gypsum crystals prohibit the secondary fracture networks from closure under a normal stress, and therefore can greatly improve the efficiency of hydraulic fracturing and gas-production rate.

Methods to Generate Microfractures

As shown above, when shale exposure to 10 wt. % (NH$_4$)$_2$S$_2$O$_8$ solution for 10 days, multiscale (μm-mm) fractures networks developed during the dissolution of carbonate minerals and gypsum crystals precipitation. The dissolution of carbonate minerals induced by the sulfuric acid, which was associated with pyrite oxidation, produced a mineral-fluid interface supersaturated with respect to CaSO$_4$ within a shale pore system. It allowed the gypsum precipitation in the immediate vicinity of the dissolving carbonate mineral surfaces. When the confined gypsum crystals come into contact with the supersaturated solution, it continued to grow and generate crystallization pressure that may induce shale fracturing because gypsum has a higher molar volume (74.4 cm$^3$/mol) than calcite (36.9 cm$^3$/mol) and dolomite (64.3 cm$^3$/mol). Based on the calculation depended on the degree of supersaturation of CaSO$_4$ solution, the crystallization pressure can easily exceed 30 MPa that may provide a sufficient driving force to crack shale during hydraulic fracturing.

Hence, sulfate acid or persulfate compound injected into conventional fracturing fluid can react with shale carbonate components, and therefore, precipitation reaction of gypsum crystal ($CaSO_4 \cdot 2H_2O$) occur because an insoluble calcium sulfate ($CaSO_4$) solid is formed. It has been found that expansion stress generated by rapid crystallization in the shale nanoscale pore space can intensively crack shale rocks without additional energy input. The spacing of reaction-induced microfractures can be close to the gypsum crystals scale (less than 100 µm), leading to the formation of much denser secondary microfracture networks. The formation of additional reaction-induced secondary microfracture networks can greatly increase the SRV. Moreover, the micrometer-scale gypsum crystals can prohibit the secondary microfracture networks from closure under a normal stress, and therefore, improve the efficiency of hydraulic fracturing and hydrocarbon production (i.e., increased permeability and increased production).

Thus, such methods to generate the microfractures improve the SRV during hydraulic fracturing in shale oil or gas reservoir by the formation of much denser secondary microfracture networks, and produce more flow pathways for hydrocarbon to migrate from the formation into the wellbore, and therefore allows the hydrocarbon to be produced from the reservoir at an increased production rate compared the conventional hydraulic fracturing.

As the great improvement of fracturing efficiency by an introduction of environmentally-friendly reagents, on the other hand, much lower volume of fracturing water than conventional fracturing solutions is required in the present invention, thus the potential damage by residual fracturing water can be reduced.

REFERENCES

Abdel-Aal, E. A. et al., Crystallization of calcium sulfate dihydrate at different supersaturation ratios and different free sulfate concentrations, *Crystal Research and Technology* 2004, 39, 313-321 ("Abdel-Aal 2004").

Al-Khaldi, M. H. et al., New insights into the removal of calcium sulfate scale, *SPE European Formation Damage Conference*, Society of Petroleum Engineers 2011 ("Al-Khaldi 2011").

Bao, Z. et al., Modeling controls on the chemical weathering of marine mudrocks from the Middle Jurassic in Southern Germany, *Chemical Geology* 2017, 459, 1-12 ("Bao 2017").

Bergsaker, A. S. et al., The effect of fluid composition, salinity, and acidity on subcritical crack growth in calcite crystals, *Journal of Geophysical Research: Solid Earth* 2016, 121, 1631-1651 ("Bergsaker 2016").

Bibby, K. J. et al., Suggested reporting parameters for investigations of wastewater from unconventional shale gas extraction, *Environ Sci. Technol.*, 2013, 47(23), 13220-13221 ("Bibby 2013").

Bultreys, T. et al., Imaging and image-based fluid transport modeling at the pore scale in geological materials: A practical introduction to the current state-of-the-art, *Earth-Science Reviews* 2016, 155, 93-128 ("Bultreys 2016").

Chen, Q. et al., Change in composition and pore structure of Longmaxi black shale during oxidative dissolution, *International Journal of Coal Geology* 2017, 172, 95-111 ("Chen 2017").

Drake, H. et al., Extreme (13)C depletion of carbonates formed during oxidation of biogenic methane in fractured granite, *Nat Commun* 2015, 6, 7020 ("Drake 2015").

Evangelou, V. et al., A review: pyrite oxidation mechanisms and acid mine drainage prevention, *Critical Reviews in Environmental Science and Technology* 1995, 25, 141-19 ("Evangelou 1995").

Ghanbari, E. et al., Impact of rock fabric on water imbibition and salt diffusion in gas shales, *International Journal of Coal Geology* 2015, 138, 55-67 ("Ghanbari 2015").

Gutierrez, M. et al., Determination of the continuous stress-dependent permeability, compressibility and poroelasticity of shale, Marine and Petroleum, *Geology* 2015, 68, 614-628 ("Gutierrez 2015").

Hakala, J. A. et al., Laboratory-Scale Studies on Chemical Reactions Between Fracturing Fluid and Shale Core From the Marcellus Shale Energy and Environmental Laboratory (MSEEL) Site, *Unconventional Resources Technology Conference*, Austin, Tex., 24-26 Jul. 2017, 1458-1467 ("Hakala 2107").

Heidari, P. et al., A reactive transport model for Marcellus shale weathering, *Geochimica et Cosmochimica Acta* 2017, 217, 421-440 ("Heidari 2017").

Jia, H. et al., Discussion of the feasibility of air injection for enhanced oil recovery in shale oil reservoirs, *Petroleum* 2017, 3 ("Jia 2017").

Jin, L. et al., Evolution of porosity and geochemistry in Marcellus Formation black shale during weathering, *Chemical Geology* 2013, 356, 50-63 ("Jin 2013").

Kan, A. T. et al., Quantitative evaluation of calcium sulfate precipitation kinetics in the presence and absence of scale inhibitors, *SPE International Symposium on Oilfield Chemistry*, Society of Petroleum Engineers 2009 ("Kan 2009").

Kelemen, P. B. et al., Reaction-driven cracking during retrograde metamorphism: Olivine hydration and carbonation, *Earth and Planetary Science Letters* 2012, 345, 81-89 ("Kelemen 2012").

Keller, W. et al., Comparative chemical compositions of aqueous extracts from representative clays, *American Mineralogist* 1989, 74, 1142-1146 ("Keller 1989").

King, G. E., Hydraulic fracturing 101: what every representative, environmentalist, regulator, reporter, investor, university researcher, neighbor, and engineer should know about hydraulic fracturing risk, *Journal of Petroleum Technology* 2012, 64, 34-42 ("King 2012").

Liang, C. et al., Oxidative degradation of MTBE by pyrite-activated persulfate: proposed reaction pathways, *Industrial & Engineering Chemistry Research* 2010, 49, 8858-8864 ("Liang 2010").

Liu, H. et al., In situ chemical oxidation of contaminated groundwater by persulfate: decomposition by Fe(III)- and Mn(IV)-containing oxides and aquifer materials, *Environ Sci Technol*, 2014, 48, 10330-10336 ("Liu 2014").

Malvoisin, B. et al., Control of serpentinisation rate by reaction-induced cracking, *Earth and Planetary Science Letters* 2017, 476, 143-152 ("Malvoisin 2017").

Manz, K. E. et al., Investigating the effects of heat activated persulfate on the degradation of furfural, a component of hydraulic fracturing fluid chemical additives, *Chemical Engineering Journal* 2017, 327, 1021-1032 ("Manz 2017").

Marcon, V. et al., Experimental insights into geochemical changes in hydraulically fractured Marcellus Shale, *Applied Geochemistry* 2017, 76, 36-50 ("Marcon 2017").

Offeddu, F. G. et al., Direct nanoscale observations of the coupled dissolution of calcite and dolomite and the precipitation of gypsum, *Beilstein J Nanotechnol* 2014, 5, 1245-1253 ("Offeddu 2014").

Meijer, J. et al., Solubilities and supersaturations of calcium sulfate and its hydrates in seawater, *Desalination* 1984, 51, 255-305 ("Meijer 1984").

Mokhtari, M. et al., Tensile Failure of Shales: Impacts of Layering and Natural Fractures, *Oncology*, Society of Petroleum Engineers 2014 ("Mokhtari 2014").

Noiriel, C. et al., Intense fracturing and fracture sealing induced by mineral growth in porous rocks, *Chemical Geology* 2010, 269, 197-209 ("Noiriel 2010").

Pearce, J. et al., Experimental and predicted geochemical shale-water reactions: Roseneath and Murteree shales of the Cooper Basin, *International Journal of Coal Geology* 2018, 187 ("Pearce 2017").

Ping, X. et al., Mechanism of sulphate expansion II. Validation of Thermodynamic Theory, *Cement and Concrete Research* 1992, 22, 845-854 ("Ping 1992").

Plümper, O. et alo, The interface-scale mechanism of reaction-induced fracturing during serpentinization, *Geology* 2012, 40, 1103-1106 ("Plumper 2012").

Putnis, A., Mineral replacement reactions, *Reviews in mineralogy and geochemistry* 2009, 70, 87-124 ("Putnis 2009").

Putnis, A., Mineral replacement reactions: from macroscopic observations to microscopic mechanisms, *Mineralogical Magazine* 2002, 66, 689-708 ("Putnis 2002").

Putnis, C. V. et al., The Mineral-Water Interface: Where Minerals React with the Environment, *Elements* 2013, 9, 177-182 ("Putnis 2013").

Putnis, C. V., Direct observations of pseudomorphism: compositional and textural evolution at a fluid-solid interface, *American Mineralogist* 2005, 90, 1909-1912 ("Putnis 2005").

Ren, L. et al, Stimulated reservoir volume estimation for shale gas fracturing: Mechanism and modeling approach, *Journal of Petroleum Science and Engineering* 2018, 166, 290-304 ("Ren 2018").

Roshan, H. et al., Mechanisms of water adsorption into partially saturated fractured shales: An experimental study, *Fuel* 2015, 159, 628-637 ("Roshan 2015").

Rostom, F. et al. Effect of fluid salinity on subcritical crack propagation in calcite, *Tectonophysics* 2013, 583, 68-75 ("Rostom 2013").

Roychaudhuri, B. et al., An experimental investigation of spontaneous imbibition in gas shales, *Journal of Petroleum Science and Engineering* 2013, 111, 87-97 ("Roychaudhuri 2013").

Røyne, A. et al., Pore-Scale Controls on Reaction-Driven Fracturing, *Reviews in Mineralogy and Geochemistry* 2015, 80, 25-44 ("Royne 2015").

Royne, A. et al., Controls on rock weathering rates by reaction-induced hierarchical fracturing, *Earth and Planetary Science Letters* 2008, 275, 364-369 ("Royne 2008").

Rudge, J. F. et al., A simple model of reaction-induced cracking applied to serpentinization and carbonation of peridotite, *Earth and Planetary Science Letters*, 2010, 291, 215-227 ("Rudge 2010").

Ruiz-Agudo, E. et al., Experimental study of the replacement of calcite by calcium sulphates, *Geochimica et Cosmochimica Acta* 2015, 156, 75-93 ("Ruiz-Agudo 2015") ("Ruiz-Agudo 2015").

Ruiz-Agudo, E. et al., Coupled dissolution and precipitation at mineral-fluid interfaces, *Chemical Geology* 2014, 383, 132-146 ("Ruiz-Agudo 2014").

Ruiz-Agudo, E. et al., The role of saline solution properties on porous limestone salt weathering by magnesium and sodium sulfates, *Environmental Geology*, 2007, 52, 269-281 ("Ruiz-Agudo 2007").

Serafeimidis, K. et al., On the crystallisation pressure of gypsum, *Environmental earth sciences* 2014b, 72, 4985-4994 ("Serafeimidis 2014b").

Serafeimidis, K. et al., The Solubilities and Thermodynamic Equilibrium of Anhydrite and Gypsum, *Rock Mechanics and Rock Engineering* 2014a, 48, 15-31 ("Serafeimidis 2014a").

Li, H. et al., Experimental Investigation on Brazilian Tensile Strength of Organic-Rich Gas Shale, Society of Petroleum Engineers 2016 ("Li 2016").

Simate, G. S. et al., Acid mine drainage: Challenges and opportunities, *Journal of Environmental Chemical Engineering* 2014, 2, 1785-1803 ("Simate 2014").

Steiger, M. et al., Crystallization of sodium sulfate phases in porous materials: The phase diagram $Na_2SO_4$—$H_2O$ and the generation of stress, *Geochimica et Cosmochimica Acta* 2008, 72, 4291-4306 ("Steiger 2008").

Steiger, M., Crystal growth in porous materials—II: Influence of crystal size on the crystallization pressure, *Journal of Crystal Growth* 2005b, 282, 470-481 ("Steiger 2005b").

Steiger, M., Crystal growth in porous materials—I: The crystallization pressure of large crystals, *Journal of Crystal Growth* 2005a, 282, 455-469 ("Steiger 2005a").

Ulven, O. I. et al., Fracture initiation during volume increasing reactions in rocks and applications for $CO_2$ sequestration, *Earth and Planetary Science Letters* 2014, 389, 132-142 ("Ulven 2014").

Vasconcelos, C. et al., Microbial mediation as a possible mechanism for natural dolomite formation at low temperatures, *Nature* 1999, 377, 220-222 ("Vasconcelos 1999").

Vidic, R. D. et al., Impact of shale gas development on regional water quality, *Science* 2012, 340, 1235009 ("Vidic 2012").

Watt, G. R. et al., Evidence for reaction-induced microfracturing in granulite facies migmatites, *Geology* 2000, 28(4), 327-330 ("Watt 2000").

Zhao, D. et al., Effect and mechanism of persulfate activated by different methods for PAHs removal in soil, *J Hazard Mater* 2013, 254-255, 228-235 ("Zhao 2013").

Zhu, W. et al., Experimental evidence of reaction-induced fracturing during olivine carbonation, *Geophysical Research Letters* 2016, 43, 9535-9543 ("Zhu 2016").

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. The scope of protection is not limited by the description set out above, but is only limited by the claims which follow, that scope including all equivalents of the subject matter of the claims.

The disclosures of all patents, patent applications, and publications cited herein are hereby incorporated herein by reference in their entirety, to the extent that they provide exemplary, procedural, or other details supplementary to those set forth herein.

Amounts and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of approximately 1 to approximately 4.5 should be interpreted to include not only the explicitly recited limits of 1 to approximately 4.5, but also to include individual numerals such as 2, 3, 4, and sub-ranges such as 1 to 3, 2 to 4, etc. The same principle applies to ranges reciting only one numerical value, such as "less than approximately 4.5," which should be interpreted to include all of the above-recited values and ranges. Further, such an interpretation should apply regardless of the breadth of the range or the characteristic being described.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a" and "an" mean "one or more" when used in this application, including the claims.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter.

As used herein, the term "about" and "substantially" when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, the term "substantially perpendicular" and "substantially parallel" is meant to encompass variations of in some embodiments within ±10° of the perpendicular and parallel directions, respectively, in some embodiments within ±5° of the perpendicular and parallel directions, respectively, in some embodiments within ±10° of the perpendicular and parallel directions, respectively, and in some embodiments within ±0.5° of the perpendicular and parallel directions, respectively.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

What is claimed is:

1. A method comprising:
   (a) selecting a well in a shale reservoir formation, wherein the well has a wellbore that is in operative fluid communication with the shale reservoir formation;
   (b) pumping fluids under pressure down the wellbore of the well to hydraulically fracture the shale reservoir formation, wherein,
       (i) all of the fluids pumped under pressure into the shale reservoir formation during the step of pumping the fluids are fracturing fluid, wherein
           (A) the fracturing fluid was made by adding a content of sulfate acid or persulfate compound material to an aqueous solution,
           (B) the sulfate acid or persulfate compound material is selected from a group consisting of (I) sulfate acids, (II) persulfate compounds, and (III) combinations thereof, and
           (C) the content of the sulfate acid or persulfate compound material that was added to the aqueous solution is at least 1 wt. % of the fracturing fluid
       (ii) an overall amount of the fluids are pumped under pressure into the shale reservoir formation during the step of pumping the fluids, and
       (iii) the concentration of the sulfate acid or persulfate compound material is at least 1 wt. % of the overall amount of the fluids pumped under pressure into the shale reservoir formation during the step of pumping the fluids;
   (c) discontinuing the pumping of the fluids; and
   (d) producing hydrocarbons from the shale reservoir formation through the wellbore.

2. The method of claim 1, wherein
   (a) the method further comprises forming gypsum crystals in the shale reservoir formation by a reaction of the sulfate acid or persulfate compound material and carbonate materials in the shale reservoir formation, and
   (b) the formation of the gypsum crystals results in a network of microfractures in the shale reservoir.

3. The method of claim 2, wherein
   (a) the content of the sulfate acid or persulfate compound material that was added to the aqueous solution is at least 10 wt. % of the fracturing fluid
   (b) the concentration of the sulfate acid or persulfate compound material is at least 10 wt. % of the overall amount of the fluids pumped under pressure into the shale reservoir formation during the step of pumping the fluids.

4. The method of claim 3, wherein
   (a) the content of the sulfate acid or persulfate compound material that was added to the aqueous solution is at most 30 wt. % of the fracturing fluid, and
   (b) the concentration of the sulfate acid or persulfate compound material is at least 30 wt. % of the overall amount of the fluids pumped under pressure into the shale reservoir formation during the step of pumping the fluids.

5. The method of claim 2, wherein the sulfate acid or persulfate compound material is selected from a group consisting of ammonium persulfate, sulfuric acid, sodium sulfate, potassium sulfate, peroxodisulfuric acid, sodium persulfate, potassium persulfate, and combinations thereof.

6. The method of claim 2, wherein the sulfate acid or persulfate compound material comprises ammonium persulfate.

7. The method of claim 2, wherein the shale reservoir formation comprises at most 30 wt. % of carbonate minerals.

8. The method of claim 2, wherein the gypsum crystals prevent the microfractures from closing under normal stress after the step of discontinuing the pumping of the fracturing fluid.

9. The method of claim 2, wherein the formation of the gypsum crystals in the shale reservoir formation provides a crystallization pressure that is at least 30 MPa.

10. The method of claim 1, wherein
(a) permeability of the shale reservoir formation near the formation is increased by the hydraulic fracturing process; and
(b) the production of hydrocarbons from the shale reservoir formation through the wellbore is increased by the hydraulic fracturing process.

11. A method comprising:
(a) injecting fluids into a shale reservoir formation having a content of carbonate mineral of at most 30 wt. %, wherein
  (i) all of the fluids injected into the shale reservoir formation during the step of injecting the fluids are fracturing fluid,
  (ii) the fracturing fluid is formed by adding a sulfate acid or persulfate compound material into an aqueous solution, wherein
    (A) the sulfate acid or persulfate compound material is selected from a group consisting of (I) sulfate acids, (II) persulfate compounds, and (III) combinations thereof, and
    (B) content of the sulfate acid or persulfate compound material added in the aqueous solution is at least 1 wt. % of the fracturing fluid,
  (iii) the fluids are injected at a pressure that hydraulically fractures the shale reservoir formation,
  (iv) an overall amount of the fluids are injected under pressure into the shale reservoir formation during the step of injecting the fluids, and
  (v) the concentration of the sulfate acid or persulfate compound material is at least 1 wt. % of the overall amount of the fluids injected under pressure into the shale reservoir formation during the step of injecting the fluids; and
(b) generating microfractures in the shale reservoir formation by a chemical reaction of carbonate components of the shale reservoir formation with the fluids, wherein the chemical reaction comprises a precipitation reaction to form gypsum crystals in the shale reservoir formation.

12. The method of claim 11, wherein the precipitation reaction to form gypsum crystals occurs because an insoluble calcium sulfate solid is formed during the reaction of the carbonate components of the shale reservoir formation with the fluids.

13. The method of claim 11, wherein
(a) the content of the sulfate acid or persulfate compound material added in the aqueous solution is at least 10 wt. % of the fracturing fluid, and
(b) the concentration of the sulfate acid or persulfate compound material is at least 10 wt. % of the overall amount of the fluids injected under pressure into the shale reservoir formation during the step of injecting the fluids.

14. The method of claim 13, wherein
(a) the content of the sulfate acid or persulfate compound material added in the aqueous solution is at most 30 wt. % of the fracturing fluid, and
(b) the concentration of the sulfate acid or persulfate compound material is at least 30 wt. % of the overall amount of the fluids injected under pressure into the shale reservoir formation during the step of injecting the fluids.

15. The method of claim 11, wherein the sulfate acid or persulfate compound material is selected from a group consisting of ammonium persulfate, sulfuric acid, sodium sulfate, potassium sulfate, peroxodisulfuric acid, sodium persulfate, potassium persulfate, and combinations thereof.

16. The method of claim 11, wherein the sulfate acid or persulfate compound material comprises ammonium persulfate.

17. The method of claim 11, wherein the gypsum crystals prevent the microfractures from closing under normal stress after discontinuing the injection of the fluids.

18. The method of claim 11, wherein the formation of the gypsum crystals in the shale reservoir formation provides a crystallization pressure that is at least 30 MPa.

19. The method of claim 11, wherein
(a) permeability of the shale reservoir formation near the formation is increased by the injection of the fluids; and
(b) the production of hydrocarbons from the shale reservoir formation through the wellbore is increased by the injection of the fluids.

20. The method of claim 11, wherein the gypsum crystals prevent the hydraulic fractures of the shale reservoir formation from closing under normal stress after discontinuing the injection of the fluids.

* * * * *